(12) United States Patent
Yamada et al.

(10) Patent No.: US 11,625,926 B2
(45) Date of Patent: Apr. 11, 2023

(54) INFORMATION PROCESSING DEVICE, INFORMATION PROCESSING METHOD, AND INFORMATION PROCESSING PROGRAM PRODUCT

(71) Applicant: KIOXIA CORPORATION, Minato-ku (JP)

(72) Inventors: Hideki Yamada, Yokohama (JP); Masanobu Shirakawa, Chigasaki (JP); Marie Kuronaga, Yokohama (JP)

(73) Assignee: KIOXIA CORPORATION, Minato-ku (JP)

( * ) Notice: Subject to any disclaimer, the term of this patent is extended or adjusted under 35 U.S.C. 154(b) by 629 days.

(21) Appl. No.: 16/567,863

(22) Filed: Sep. 11, 2019

(65) Prior Publication Data

US 2020/0005059 A1    Jan. 2, 2020

Related U.S. Application Data

(63) Continuation of application No. PCT/JP2018/030757, filed on Aug. 21, 2018.

(30) Foreign Application Priority Data

Mar. 22, 2018 (JP) .............................. JP2018-054801

(51) Int. Cl.
*G06V 20/59* (2022.01)
*H04W 4/40* (2018.01)
(Continued)

(52) U.S. Cl.
CPC ......... *G06V 20/59* (2022.01); *G01C 21/3438* (2013.01); *G01C 21/3605* (2013.01);
(Continued)

(58) Field of Classification Search
CPC ................... G01C 21/3605; G05D 2201/0213
See application file for complete search history.

(56) References Cited

U.S. PATENT DOCUMENTS

2008/0242227 A1    10/2008  Cheng
2010/0280700 A1*  11/2010  Morgal .................. G06Q 10/02
                                                                    705/5
(Continued)

FOREIGN PATENT DOCUMENTS

CN          205737215 U      11/2016
EP          3 151 158 A1     4/2017
(Continued)

OTHER PUBLICATIONS

International Search Report dated Oct. 30, 2018 in PCT/JP2018/030757, 4 pages (with English translation of categories of cited references).

*Primary Examiner* — Jeff A Burke
*Assistant Examiner* — Christopher A Buksa
(74) *Attorney, Agent, or Firm* — Oblon, McClelland, Maier & Neustadt, L.L.P.

(57) ABSTRACT

According to one embodiment, an information processing device includes: a first memory; a first receiver; a first determination section; and a first transmitter. The first memory is configured to store first image data of interior of a vehicle at a first point in time. The first receiver is configured to receive second image data of the interior of the vehicle at a second point of time from the vehicle. The first determination section is configured to determine whether a change has been caused in the interior of the vehicle between the first point in time and the second point in time. The first transmitter is configured to transmit first data based on the determination result.

6 Claims, 40 Drawing Sheets

(51) Int. Cl.
  *G01C 21/34* (2006.01)
  *G01C 21/36* (2006.01)
  *G05D 1/00* (2006.01)

(52) U.S. Cl.
  CPC ............ G05D 1/0088 (2013.01); H04W 4/40 (2018.02); *G05D 2201/0213* (2013.01)

(56) References Cited

U.S. PATENT DOCUMENTS

| | | |
|---|---|---|
| 2013/0246301 A1 | 9/2013 | Radhakrishnan et al. |
| 2014/0032297 A1* | 1/2014 | Germann ............ G06Q 30/0226 705/14.27 |
| 2015/0199619 A1 | 7/2015 | Ichinose et al. |
| 2016/0205246 A1 | 7/2016 | Sim et al. |
| 2016/0332535 A1 | 11/2016 | Bradley et al. |
| 2017/0098364 A1 | 4/2017 | Jaegal |
| 2017/0132934 A1* | 5/2017 | Kentley ................. G08G 1/202 |
| 2018/0297612 A1* | 10/2018 | Fukamachi ........... B60W 50/08 |

FOREIGN PATENT DOCUMENTS

| | | |
|---|---|---|
| JP | 4-39358 A | 2/1992 |
| JP | 5-168686 A | 7/1993 |
| JP | 2002-149766 A | 5/2002 |
| JP | 2003-67471 A | 3/2003 |
| JP | 2004-362271 A | 12/2004 |
| JP | 2005-115911 A | 4/2005 |
| JP | 2008-27239 A | 2/2008 |
| JP | 2009-73242 | 4/2009 |
| JP | 2009-171123 A | 7/2009 |
| JP | 2012-43042 A | 3/2012 |
| JP | 2014-38448 A | 2/2014 |
| JP | 5891306 B2 | 3/2016 |
| JP | 2017-204867 A | 11/2017 |
| KR | 10-2014-0142787 A | 12/2014 |
| KR | 10-2015-0044612 A | 4/2015 |
| KR | 10-2017-0040015 A | 4/2017 |
| WO | WO 2013/035087 A1 | 3/2013 |
| WO | WO 2014/024254 A1 | 2/2014 |
| WO | WO-2016183241 A1 * | 11/2016 ............. B60N 2/002 |

* cited by examiner

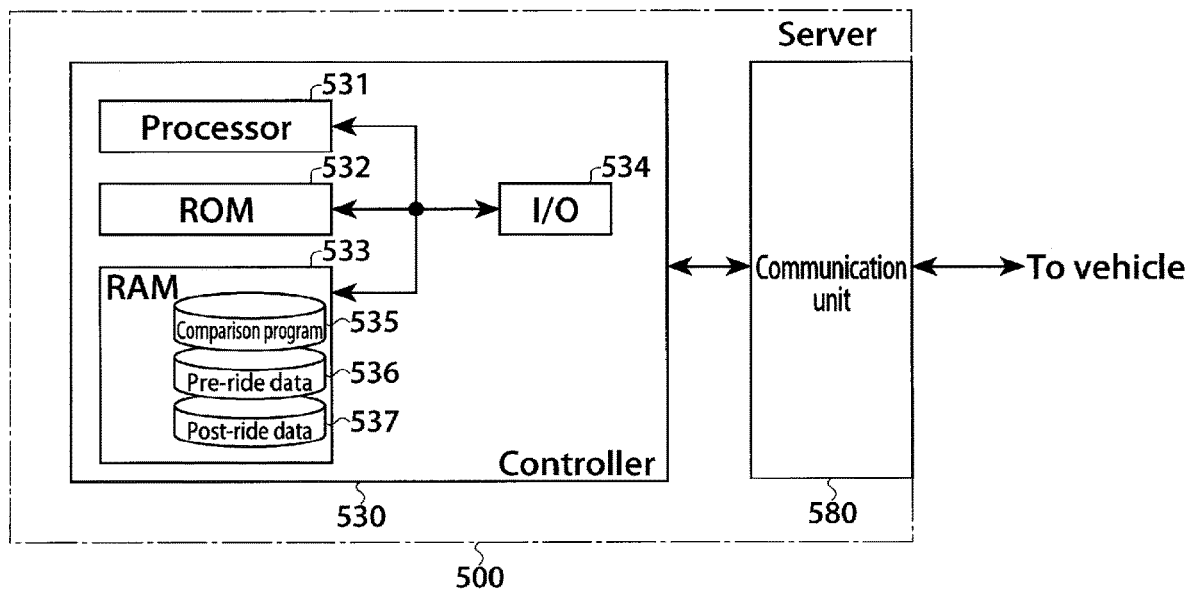
F I G. 4A
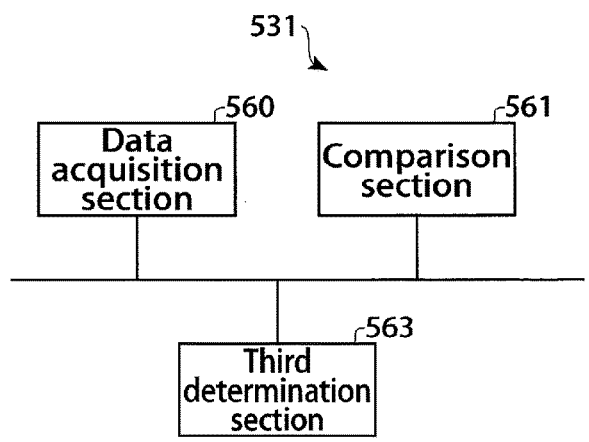
F I G. 4B

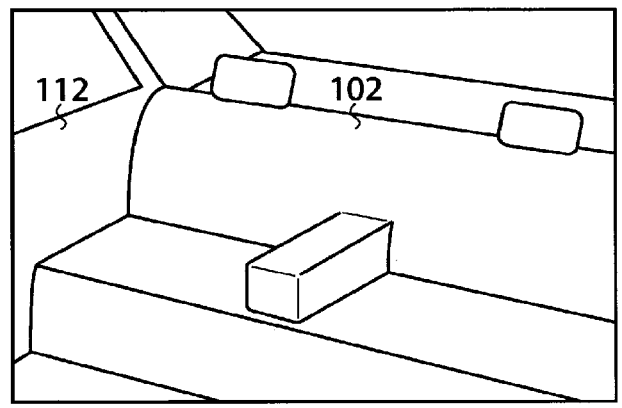
F I G. 6A
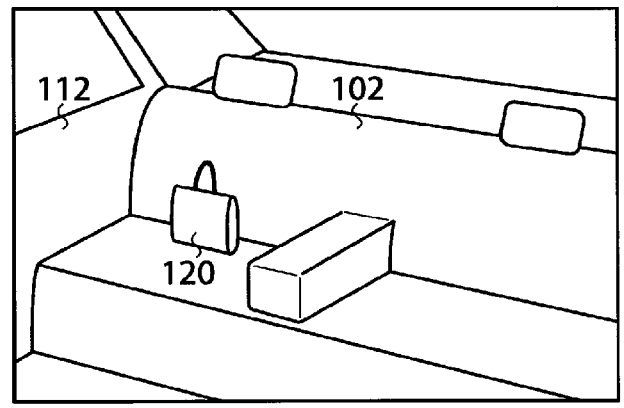
F I G. 6B
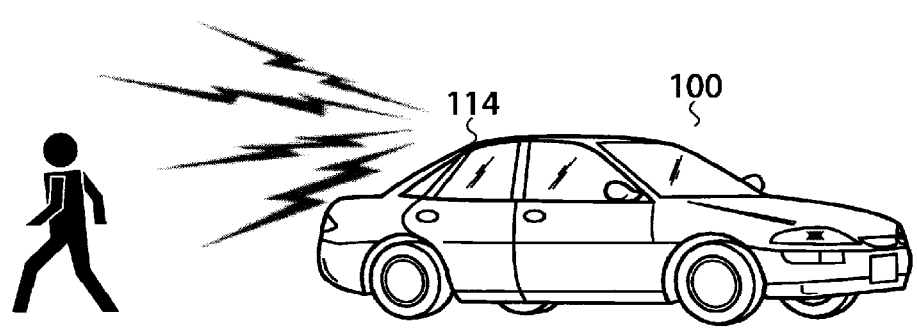
F I G. 6C

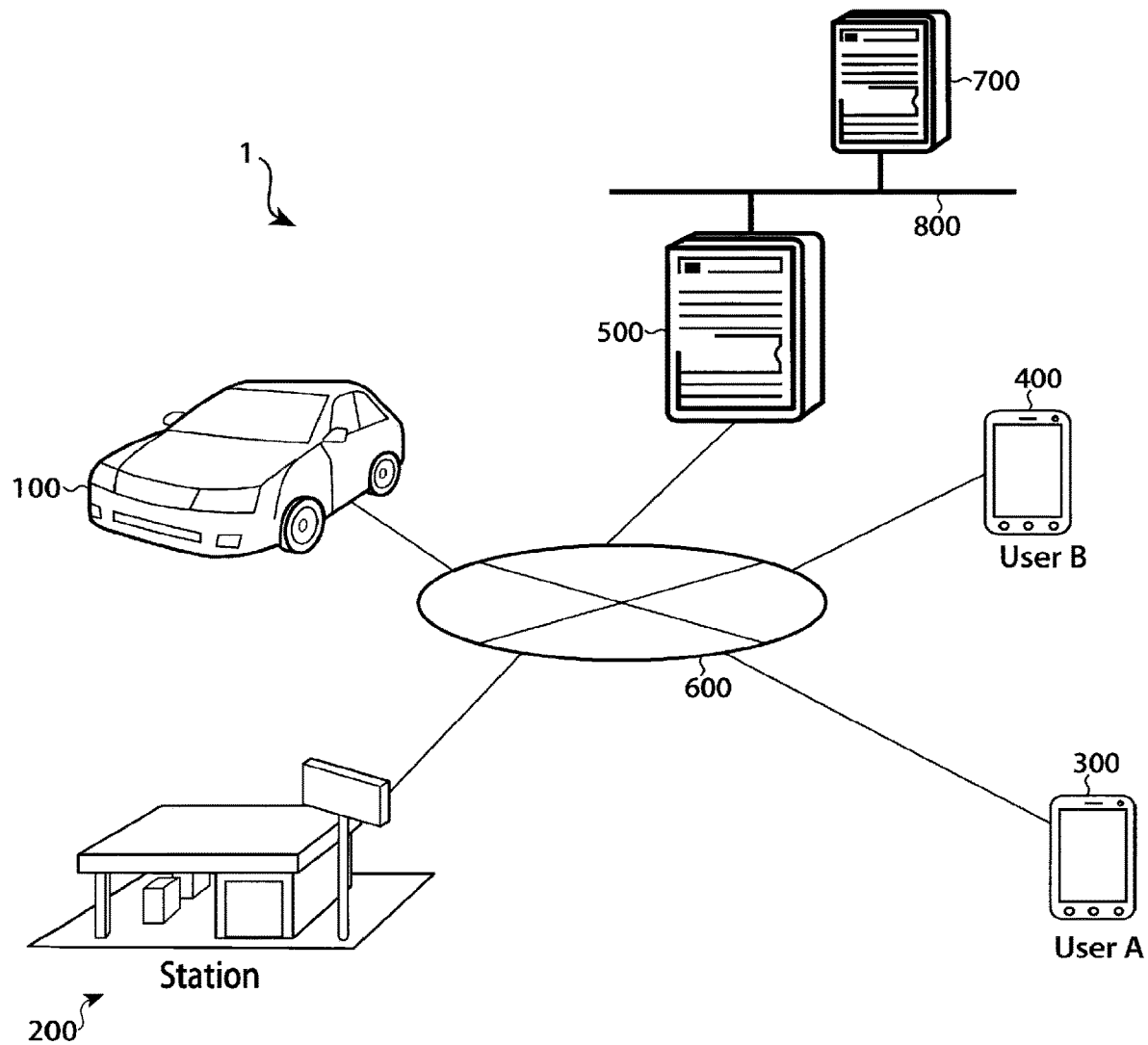
F I G. 7

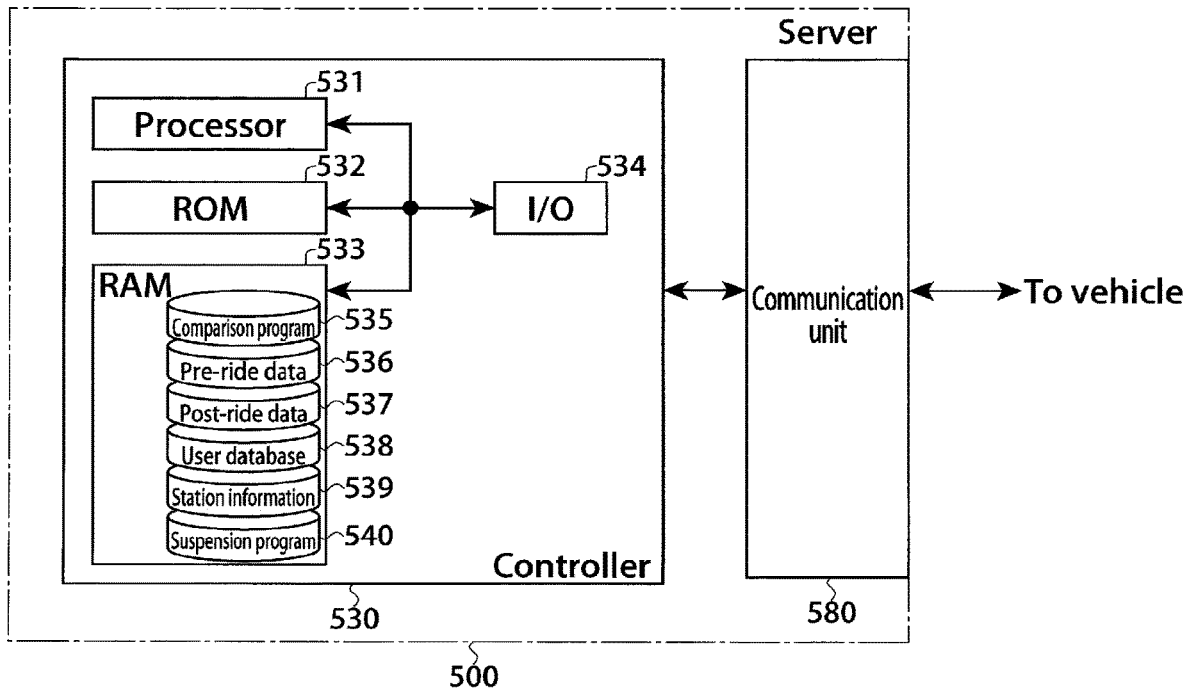
FIG. 9A
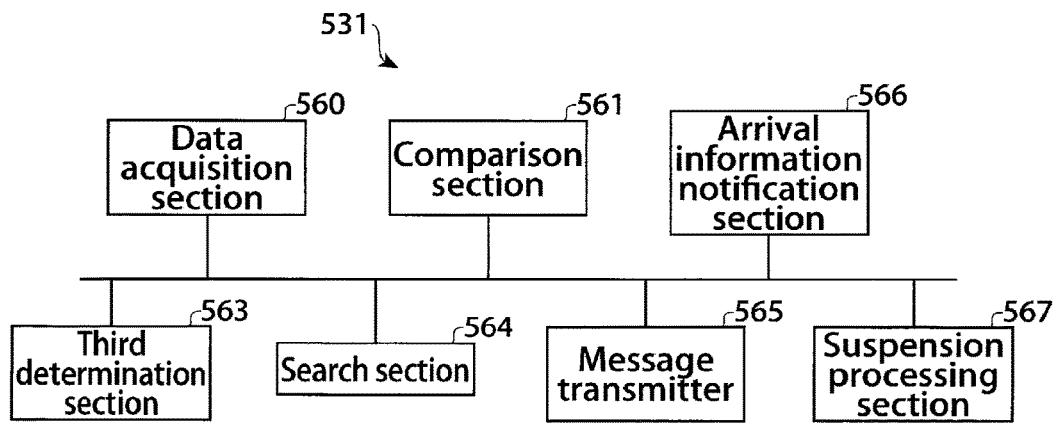
FIG. 9B
| User ID | Username | Contact e-mail address |
|---|---|---|
| 0001 | A | A***@***.ne.jp |
| 0002 | B | B***@***.ne.jp |
| ⋮ | ⋮ | ⋮ |
FIG. 9C

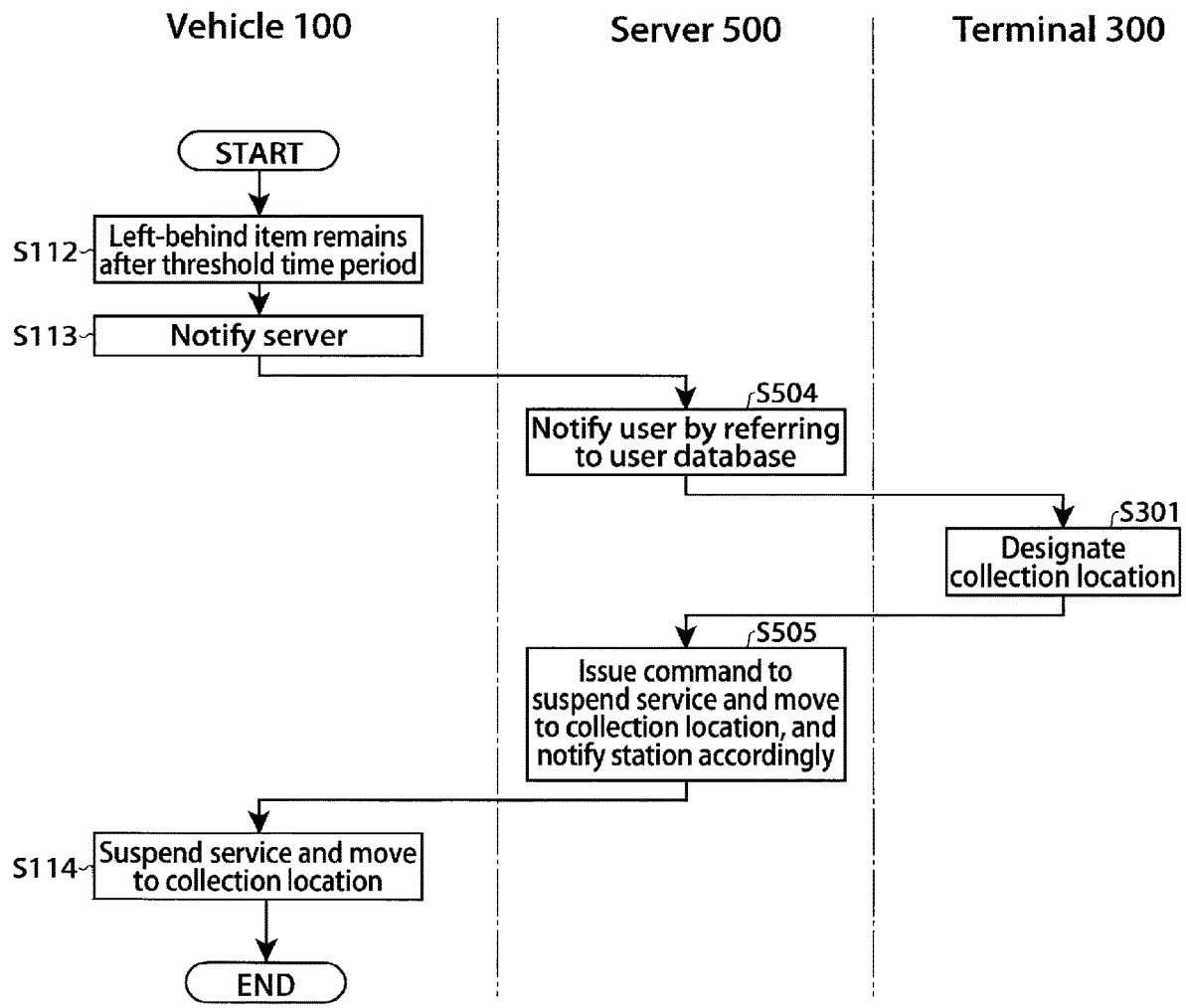
F I G. 10

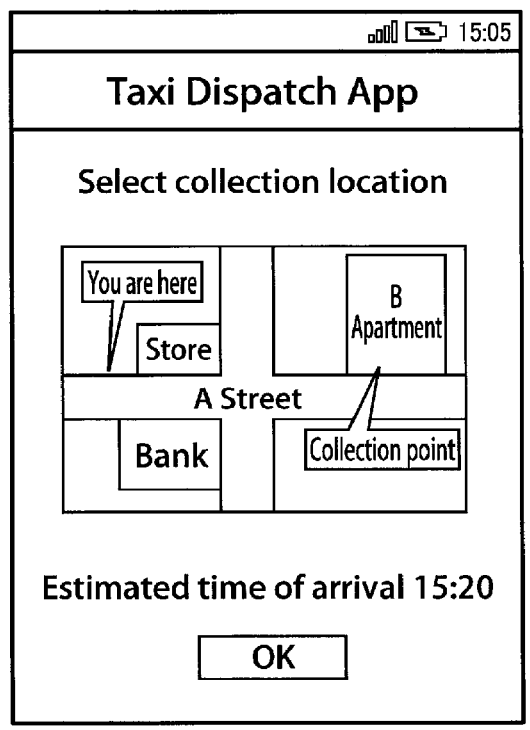
F I G. 15A
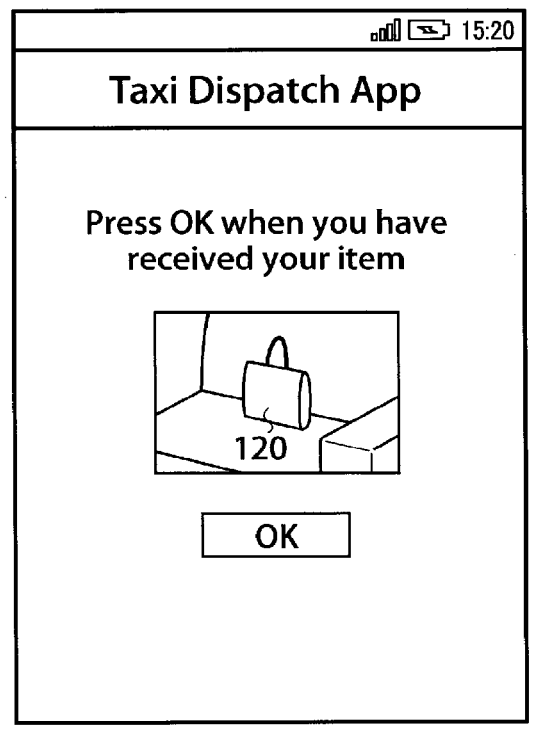
F I G. 15B

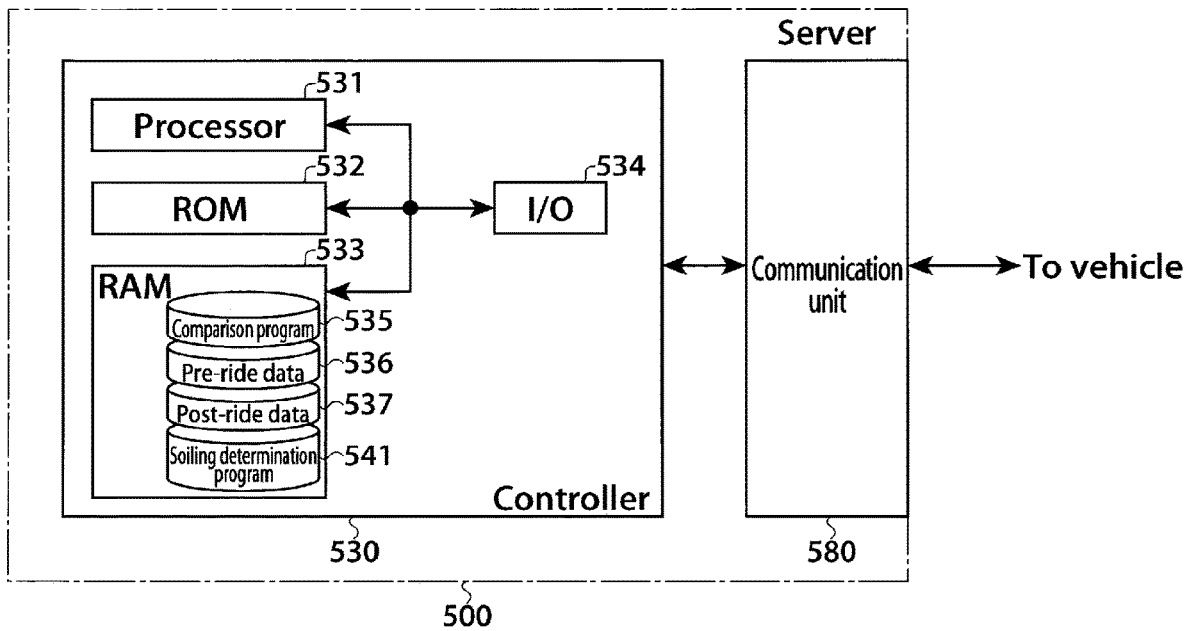
F I G. 17A
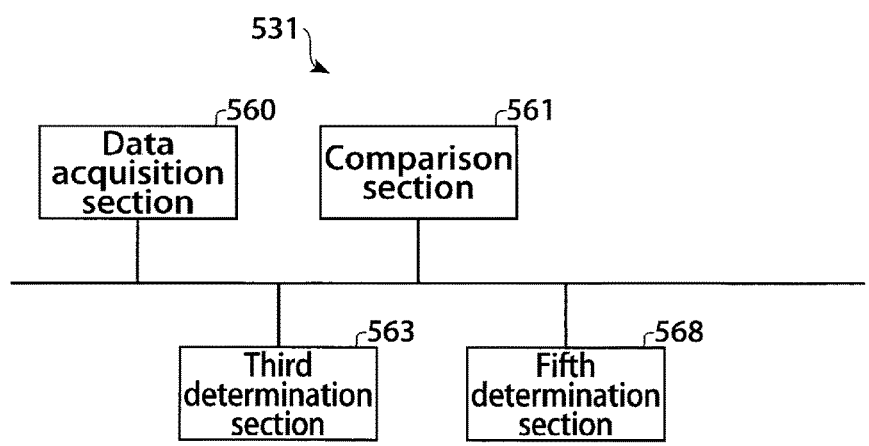
F I G. 17B

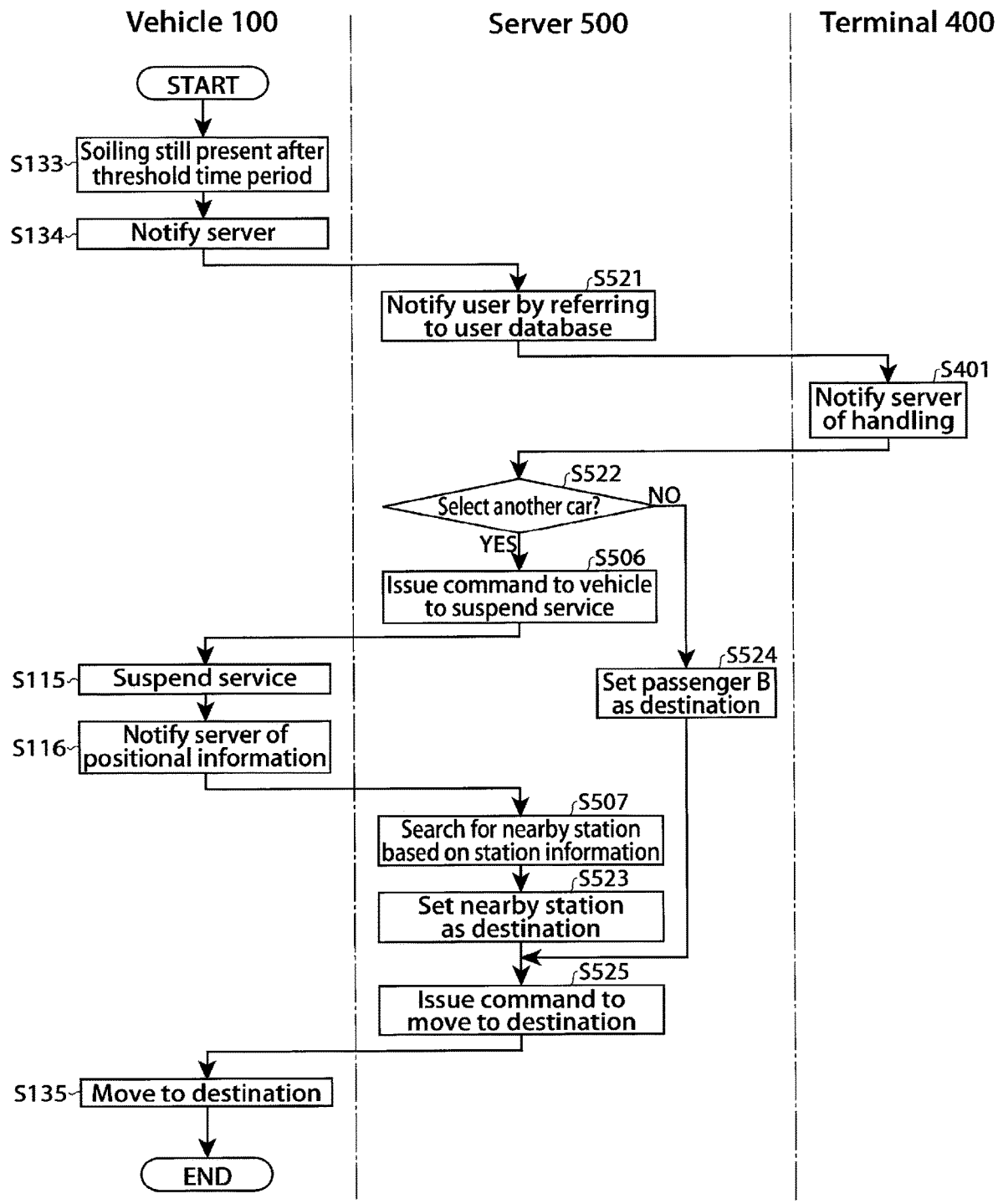
F I G. 20

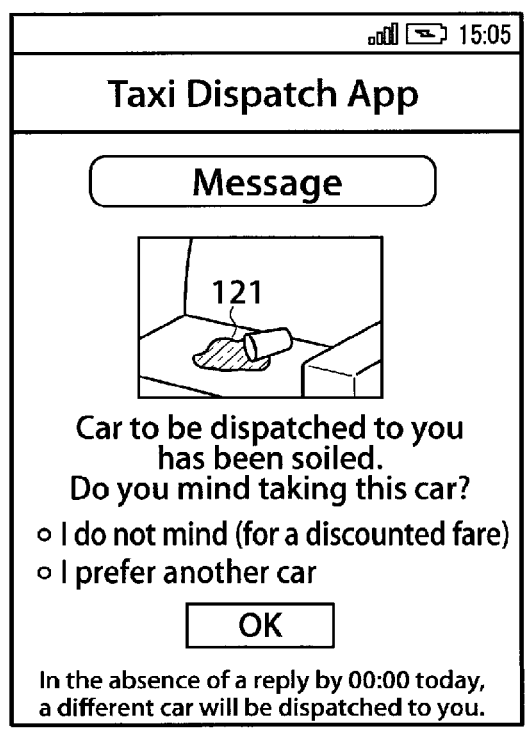
F I G. 21

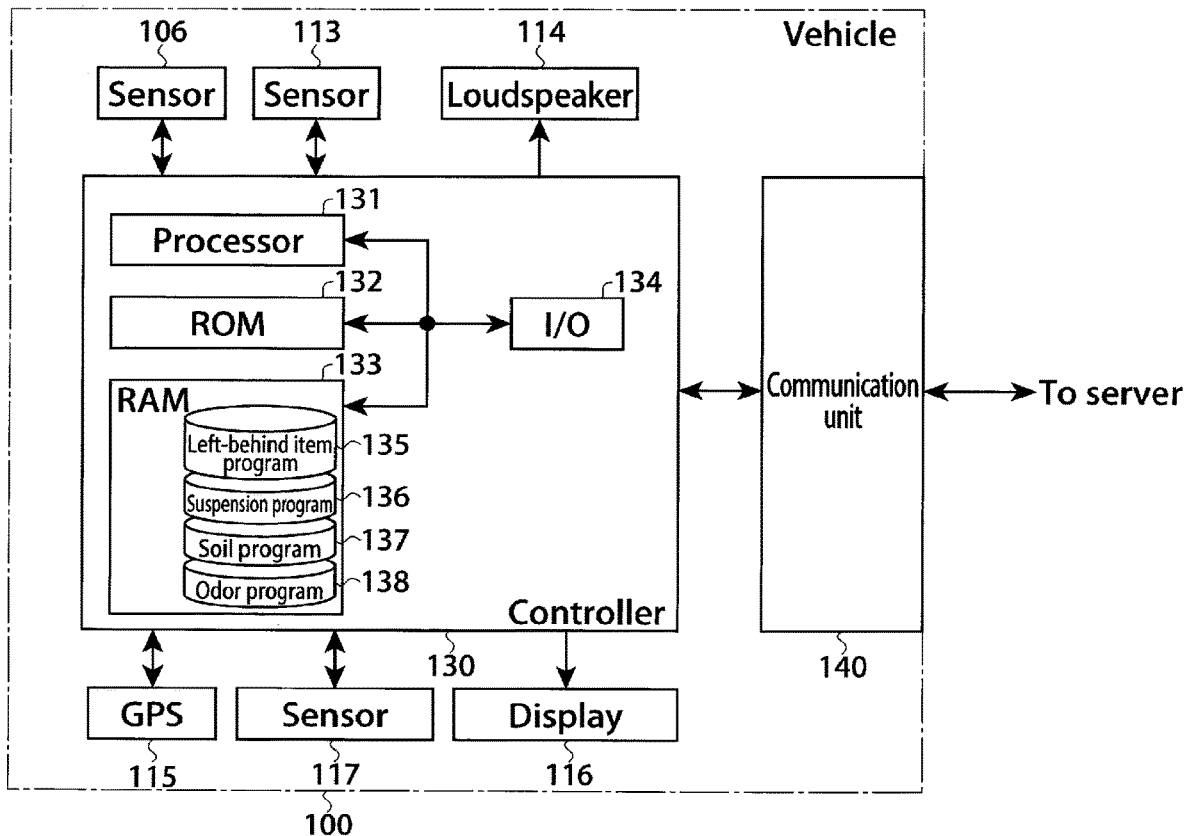
F I G. 26A
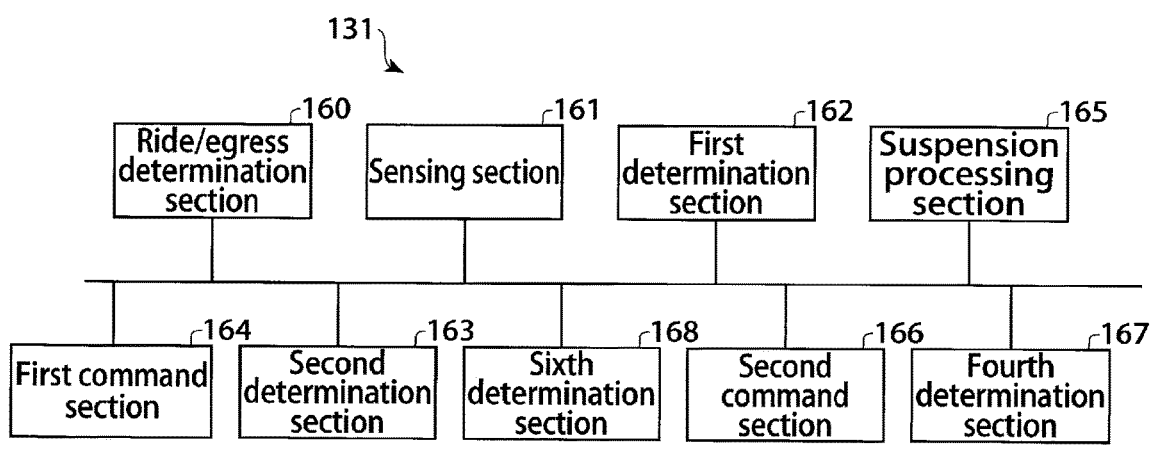
F I G. 26B

| User ID | Username | Contact e-mail address | Points |
|---|---|---|---|
| 0001 | A | A***@***.ne.jp | 1000 |
| 0002 | B | B***@***.ne.jp | 500 |
| 0002 | C | C***@***.co.jp | 2000 |
| ⋮ | ⋮ | ⋮ | ⋮ |

FIG. 28A

| Points | User rank | Applicable fare |
|---|---|---|
| 1500 or over | Excellent | 5% discount |
| 1000~1499 | Normal | Regular fare |
| 750~999 | Rank A | 5% surcharge |
| 500~749 | Rank B | 10% surcharge |
| 250~499 | Rank C | 15% surcharge |
| 1~249 | Rank D | 20% surcharge |
| 0 or below | Rank E | Ride refused |

FIG. 28B

| Ride manner | Points earned | Applicable conditions |
|---|---|---|
| Platinum | +5 points | • Take vehicle carrying left-behind item and drop off item before one's own destination<br>• Clean soiled area left by another |
| Gold | +3 points | • Take vehicle carrying left-behind item and drop off item after one's own destination<br>• Take vehicle soiled by another<br>• Take odorous vehicle |
| Silver | +1 point | Regular |
| Bronze | -100 points | • Soiling<br>• Leaving odor |

FIG. 28C

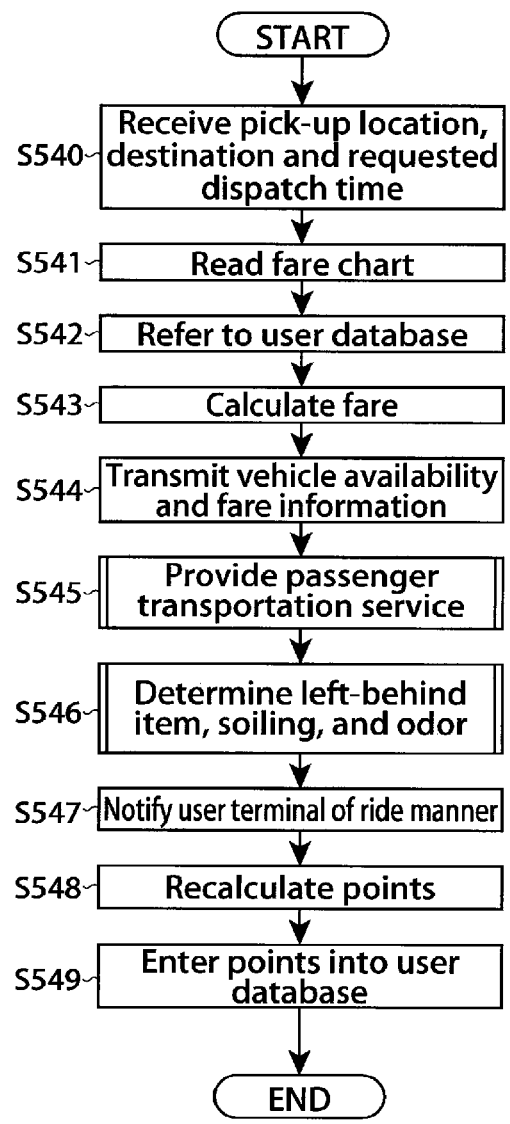
F I G. 29

| Vehicle | Schedule | | | | | | | | |
|---|---|---|---|---|---|---|---|---|---|
| | 8:00 | 9:00 | 10:00 | 11:00 | 12:00 | 13:00 | 14:00 | 15:00 | ...... |
| XX | | | User A | | | | | | |
| YY | | | | | | | | | |
| ZZ | | | | | User C | | | | |
| ⋮ | | | | | | | | | |

F I G. 30C

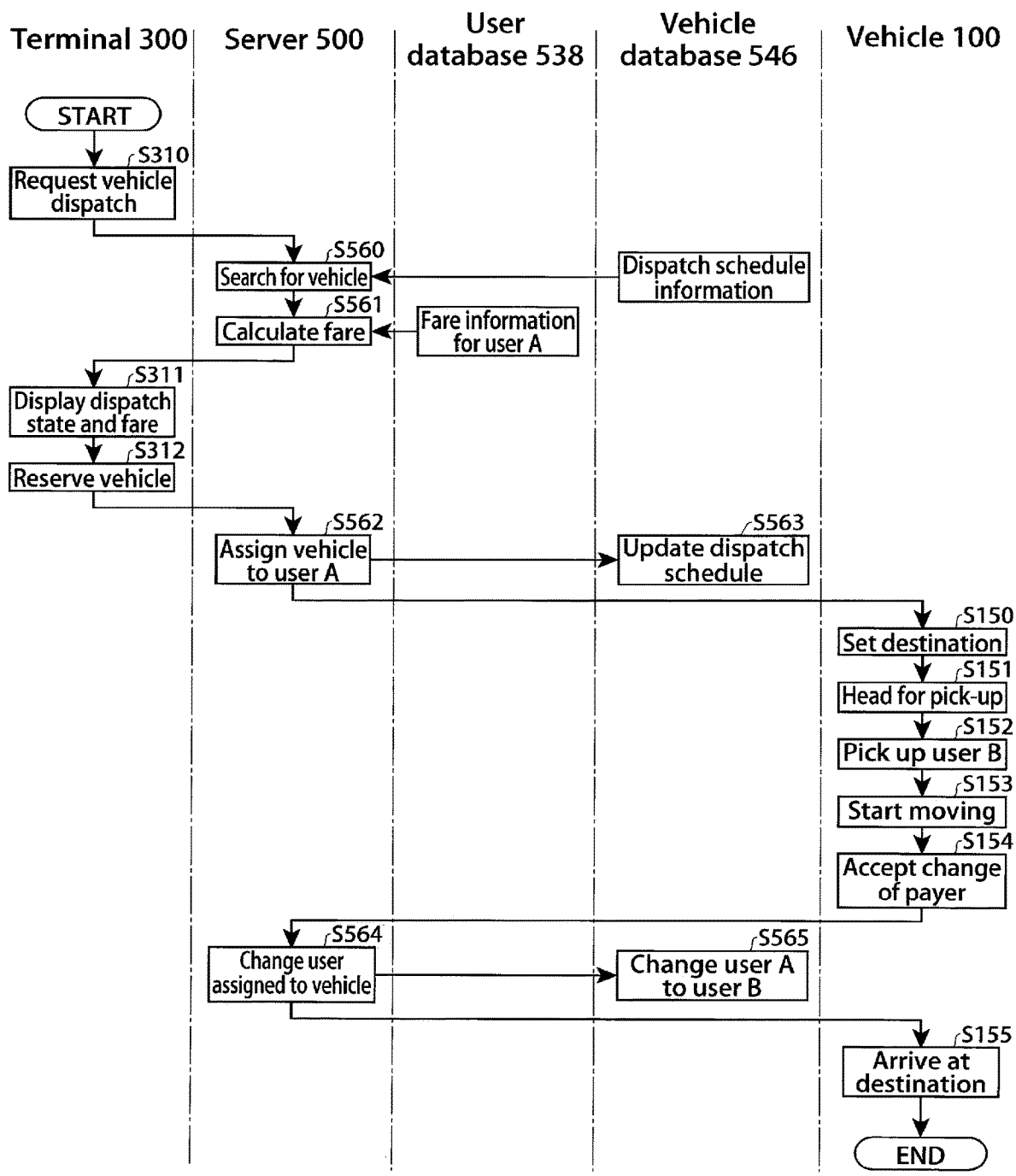
F I G. 31

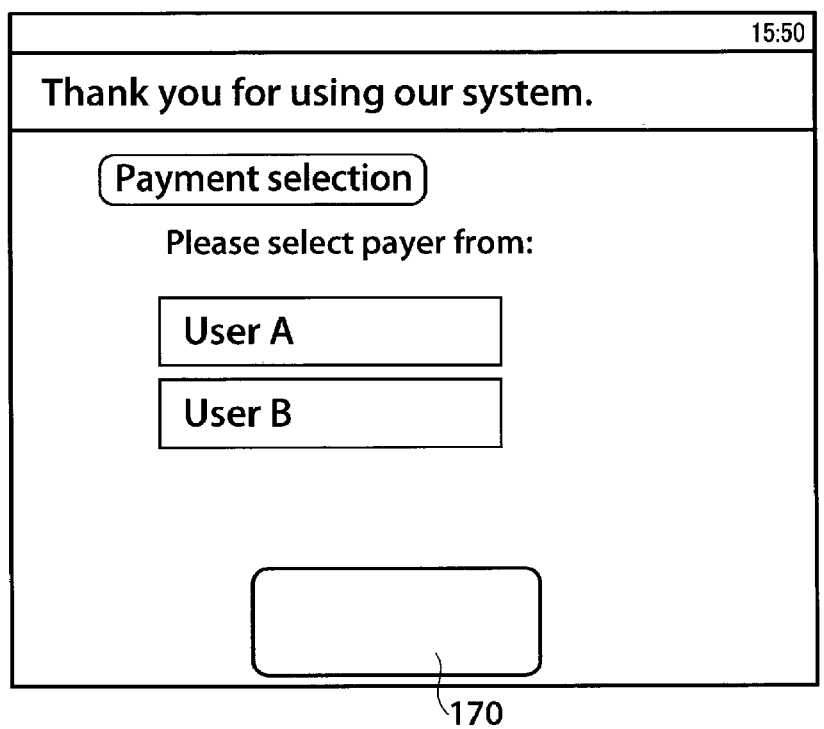
F I G. 33C

INFORMATION PROCESSING DEVICE, INFORMATION PROCESSING METHOD, AND INFORMATION PROCESSING PROGRAM PRODUCT

CROSS REFERENCE TO RELATED APPLICATIONS

This application is a Continuation Application of PCT Application No. PCT/JP2018/030757, filed Aug. 21, 2018 and based upon and claiming the benefit of priority from prior Japanese Patent Applications No. 2018-054801, filed Mar. 22, 2018, the entire contents of all of which are incorporated herein by reference.

FIELD

Embodiments described herein relate generally to an information processing device, information processing method, and information processing program.

BACKGROUND

In recent years, research has been actively conducted on autonomous vehicle driving.

BRIEF DESCRIPTION OF THE DRAWINGS

FIG. 4A is a block diagram of a server according to the first embodiment.

FIG. 4B is a functional block diagram of the processor of the server according to the first embodiment.

FIG. 6A is a schematic diagram of an exemplary image stored in the server according to the first embodiment.

FIG. 6B is a schematic diagram of an exemplary image taken in the taxi according to the first embodiment.

FIG. 6C is a schematic diagram of a taxi sounding an alert according to the first embodiment.

FIG. 7 is a conceptual diagram of a taxi operation system according to the second embodiment.

FIG. 9A is a block diagram of a server according to the second embodiment.

FIG. 9B is a functional block diagram of the processor of the server according to the second embodiment.

FIG. 9C is a conceptual diagram of a user database according to the second embodiment.

FIG. 10 is a flowchart of the process of the taxi operation system according to the second embodiment.

FIG. 15A is a schematic diagram of an exemplary display screen of the user's terminal according to the second embodiment.

FIG. 15B is a schematic diagram of an exemplary display screen of the user's terminal according to the second embodiment.

FIG. 17A is a block diagram of a server according to the third embodiment.

FIG. 17B is a functional block diagram of the processor of the server according to the third embodiment.

FIG. 20 is a flowchart of the process of the taxi operation system according to the third embodiment.

FIG. 21 is a schematic diagram of an exemplary display screen of the user's terminal according to the third embodiment.

FIG. 26A is a block diagram of a taxi according to the fifth embodiment.

FIG. 26B is a functional block diagram of the processor of the taxi according to the fifth embodiment.

FIG. 28A is a conceptual diagram of a user database according to the fifth embodiment.

FIG. 28B and FIG. 28C are conceptual diagrams of fare calculation data according to the fifth embodiment.

FIG. 29 is a flowchart of the process of the taxi operation system according to the fifth embodiment.

FIG. 30C is a conceptual diagram of a vehicle database according to the sixth embodiment.

FIG. 31 is a flowchart of the process of the taxi operation system according to the sixth embodiment.

FIG. 33A, FIG. 33B and FIG. 33C are schematic diagrams of an exemplary display screen of the display inside the taxi according to the sixth embodiment.

DETAILED DESCRIPTION

In general, according to one embodiment, an information processing device includes: a first memory; a first receiver; a first determination section; and a first transmitter. The first memory is configured to store first image data of interior of a vehicle at a first point in time. The first receiver is configured to receive second image data of the interior of the vehicle at a second point of time, which is later than the first point in time, from the vehicle by wireless communication. The first determination section is configured to determine whether a change has been caused in the interior of the vehicle between the first point in time and the second point in time, based on the first image data and the second image data. The first transmitter is configured to transmit first data based on the determination result obtained at the first determination section, to the vehicle by wireless communication.

1. First Embodiment

An information processing device, information processing method, and information processing program according to the first embodiment are explained. The present embodiment relates to, in general, a passenger automobile transportation business (hereinafter referred to as a "taxi business"), an operation method of a vehicle having Level 4 or 5 of autonomous driving that does not require a driver. Specifically, the present embodiment relates to the handling of a passenger's belongings left behind in a vehicle that is in service as a taxi.

1.1. Structure 1.1.1. Overall Structure

Figure 1:
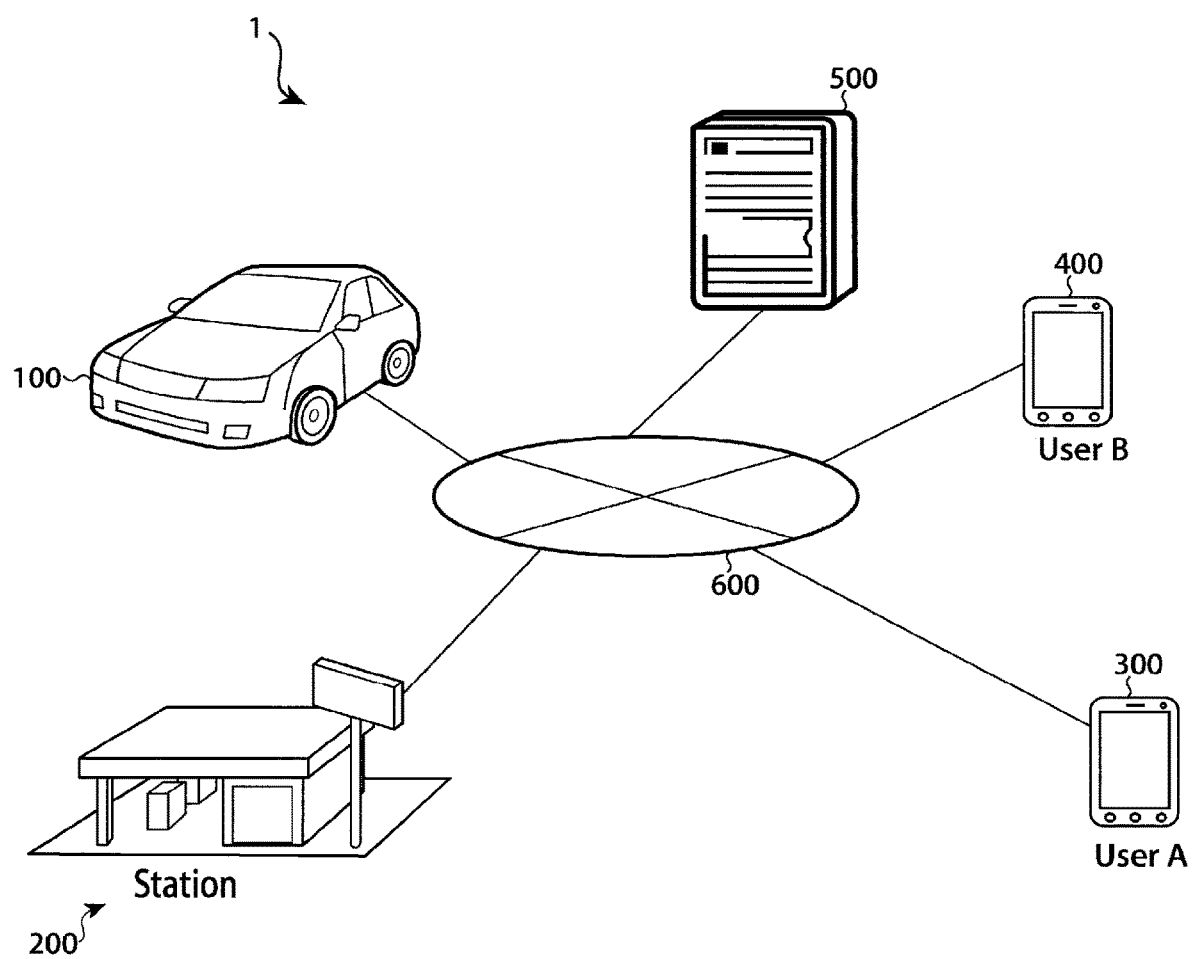
FIG. 1 is a conceptual diagram of a taxi operation system according to the first embodiment.

FIG. 1 shows an exemplary structure of a taxi operation system according to the present embodiment. As shown in this drawing, a taxi operation system 1 includes a vehicle 100, a station 200, and a server 500. The vehicle 100, station 200, and server 500 are mutually communicable via a network 600, for example, by wireless communication. This system 1 is accessible by a plurality of users (user A and user B in FIG. 1) from personal digital assistants 300 and 400, respectively. The following explanation will deal with smartphones by way of example of the personal digital assistants 300 and 400. However, any portable information communication terminals may be adopted, such as cellular phones, tablet PCs, or notebook PCs.

As mentioned earlier, the vehicle 100 is capable of autonomously driving and carrying passengers to a destination with no driver present. The vehicle 100 is provided with a wireless communication function, and is thus allowed to communicate with the server 500 via the network 600.

The vehicle 100 is maintained, cleaned, and refueled at the station 200, which is a facility that also serves as a parking lot for the vehicle 100. Service staff may be stationed at the station 200, and maintenance, cleaning and management of the vehicle 100 are provided by the staff. The station 200 is connected to the network 600 in a wired or wireless manner so as to be communicable with the server 500 via the network 600. An information terminal of the station 200 sends various commands to the vehicle 100 by way of the server 500, as needed. In addition, information from the vehicle 100 is sent to the information terminal of the station 200 by way of the server 500.

In response to requests from the vehicle 100, station 200, and smartphones 300 and 400, the server 500 executes various types of processing, offers various types of information to the vehicle 100 and smartphones 300 and 400, and sends various commands to the vehicle 100. In other words, the server 500 controls the entire processing of the system 1.

In the next section, the vehicle 100 and server 500 will be described in detail.

1.1.2. Structure of Vehicle 100

Figure 2:
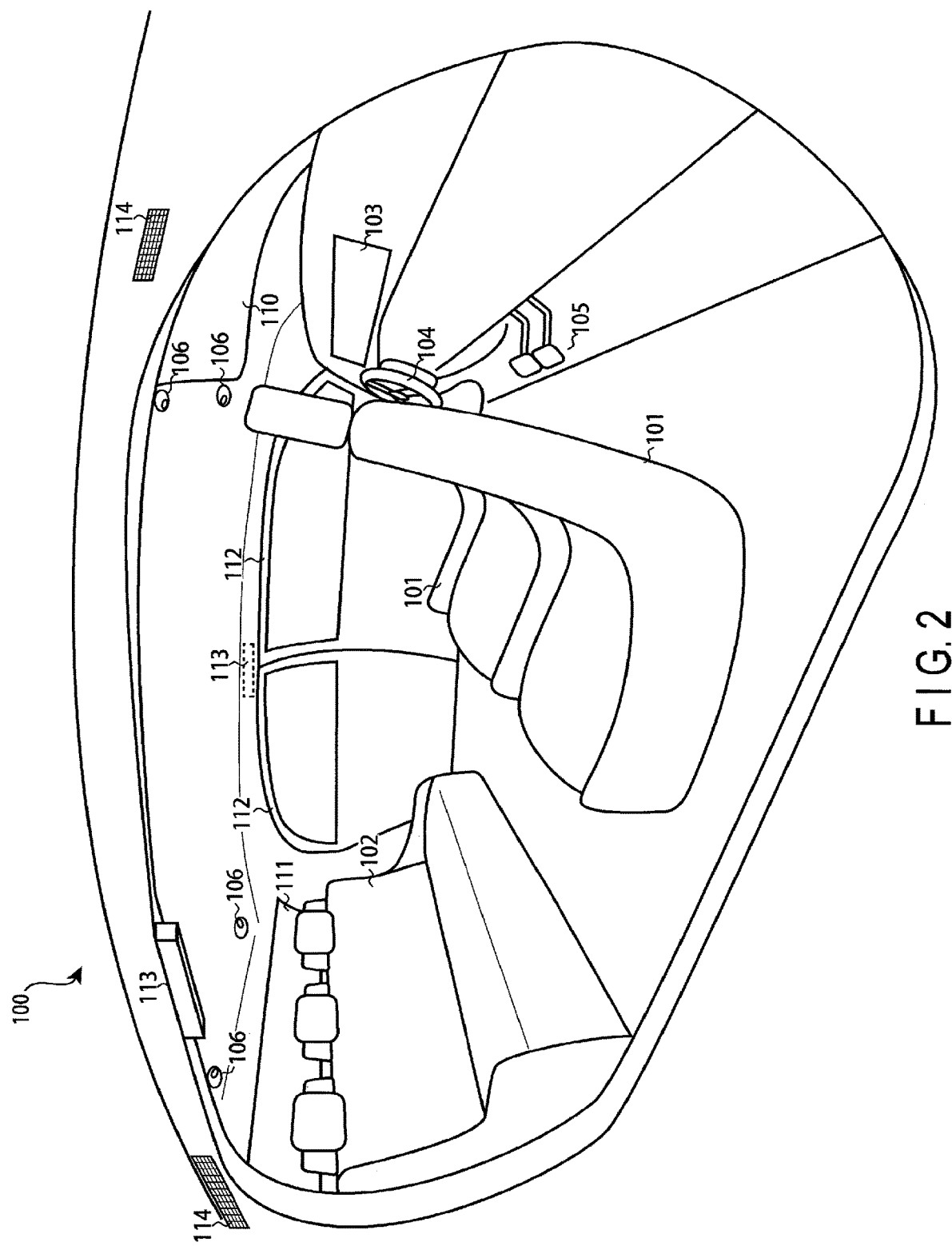
FIG. 2 is a schematic diagram of the interior of a taxi according to the first embodiment.

First, the structure of the vehicle 100 is explained. FIG. 2 is a schematic diagram of the vehicle 100, illustrating its interior, which is visible when a side door is opened.

As illustrated here, the interior of the vehicle 100 includes front seats 101, a rear seat 102, an instrumental panel 103, a steering wheel 104, gas and brake pedals 105, and image sensors 106.

The seats 101 and 102 may be installed on the interior floor of the vehicle 100 to face each other. The vehicle 100, which drives autonomously, requires no driver to sit and look ahead for driving. In this example, the front seats 101 of the vehicle 100 face the rear seat. The front seats may be designed to be rotatable between forward-facing and backward-facing positions.

The instrumental panel 103 displays information relating to the state of the vehicle 100, including the traveling speed of the vehicle 100, the number of revolutions of the engine, and the amount of fuel available (amount of remaining gas for gasoline-powered vehicles, or amount of remaining battery power for electric vehicles). The instrumental panel 103 may be further provided with a navigation function, or with a function of receiving an input of a destination from a passenger, and displaying a fare if the vehicle is in service as a taxi. A touch-panel display may be arranged on the rear side of the backrest of a front seat 101 so as to serve the functions of receiving an input of a destination and displaying the fare.

The steering wheel 104 and gas and brake pedals 105 are used not in autonomous driving, but in the driving of the vehicle by a driver.

Multiple sensors 106 are arranged on the ceiling of the vehicle 100 near the windshield 110, and also near the rear window 111. The sensors 106 may be wide-angle digital cameras or video cameras. With these sensors 106, the interior of the vehicle can be recorded so as to ensure that no blind spot is created. The distance between each sensor 106 and an item in the vehicle may be measured in accordance with the triangulation and based on the images acquired by the sensors 106.

The vehicle 100 is further provided with an open/close sensor 113 to detect the opening and closing of the front and rear doors 112, and also with a loudspeaker 114 to sound an alert toward the outside of the vehicle 100.

Figure 3A:
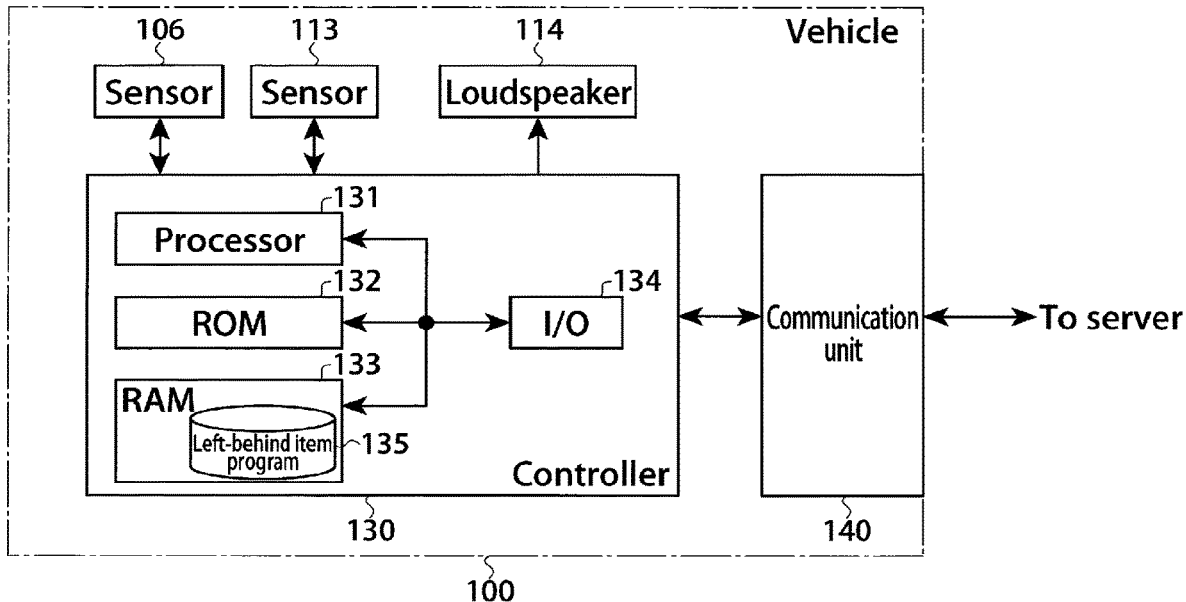
FIG. 3A is a block diagram of the taxi according to the first embodiment.

FIG. 3A is a block diagram showing an exemplary hardware structure that relates to the handling of a passenger's belongings left behind in the vehicle 100. As illustrated in this drawing, the vehicle 100 mainly includes a controller 130 and a communication unit 140, in addition to the above-mentioned sensors 106 and 113 and the loudspeaker 114.

The sensors 106 acquire the image data of the interior of the vehicle 100 and send it to the controller 130, as explained above. Upon the detection of the opening or closing of a door 112, the sensor 113 sends this information to the controller 130. In response to a command from the controller 130, the loudspeaker 114 sounds an alert toward the outside of the vehicle 100.

The communication unit 140 is a wireless communication circuit that can transmit and receive information with respect to the server 500 via the network 600 by wireless communication. The communication unit 140 transfers the data received from the server 500 to the controller 130, and transmits the data received from the controller 130 to the server 500.

The controller 130 controls the processes relating to any left-behind item in the vehicle. The controller 130 includes a processor 131, a ROM 132, a RAM 133, and an input/output circuit 134. The ROM 132 and RAM 133 store programs to be implemented by the processor 131, and necessary data. The RAM 133 serves as a work area of the processor 131. The input/output circuit 134 controls the transmission/reception of information with respect to the communication unit 140. The processor 131 implements the programs stored in the ROM 132 and RAM 133. According to the present embodiment, the RAM 133 stores therein a left-behind item program 135. By the left-behind item program 135 implemented by the processor 131, the vehicle 100 executes a left-behind item handling operation.

Figure 3B:
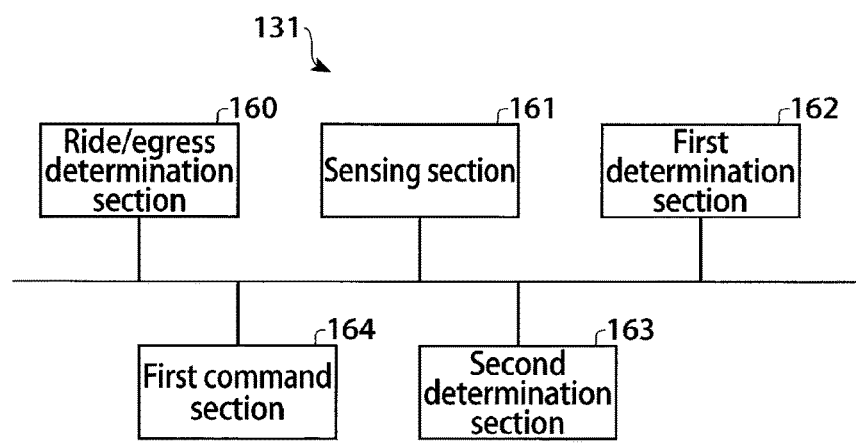
FIG. 3B is a functional block diagram of the processor of the taxi according to the first embodiment.

FIG. 3B is a functional block diagram of the processor 131 when implementing the left-behind item program 135. As illustrated in FIG. 3B, the processor 131 that implements the program 135 functions as a ride/egress determination section 160, a sensing section 161, a first determination section 162, a second determination section 163, and a first command section 164.

The ride/egress determination section 160 detects the opening, closing, or both, of any door 112, based on a signal from a sensor 113. The ride/egress determination section 160 determines, based on this detection result, whether the passenger rides (i.e. getting in the vehicle of the passenger) or egresses (i.e. getting out of the vehicle of the passenger) the vehicle 100.

The sensing section 161 issues a command to the sensors 106 to sense the interior of the vehicle. In particular, when the ride/egress determination section 160 determines that a passenger has ridden or egressed the vehicle, the sensing section 161 issues a command to the sensors 106 to take images of the interior of the vehicle, and thereby receives image data acquired by the sensors 106. This image data may be held in the RAM 133, and transmitted to the server 500 via the communication unit 140.

Based on the information received from the server 500, the first determination section 162 determines whether there is any item left behind in the vehicle. Alternatively, the first determination section 162 determines whether the information indicating that an item is left behind in the vehicle is received from the server 500. The first determination section 162 may modify the information received from the server 500. For example, the left-behind item presence/absence information received from the server 500 may be represented in percentage (%) form, so that the first determination section 162 can execute processing based on this percentage to determine the presence/absence of any left-behind item. For example, the item may be finally determined as a left-behind item if the percentage value is indicated as 50% or greater, but the first determination section 162 may weight this percentage and thereby alter it to 60% or 40%. That is, the first determination section 162 may modify the percentage value indicating the possibility of the presence of a left-behind item, which is received from the server 500, in accordance with the conditions. The first determination section 162 may thereby determine whether or not a left-behind item is present, based on the modified result. The modification of the information by the first determination section 162 is not limited to the above, and any other suitable method may be adopted.

When the first determination section 162 determines that there is a left-behind item, the second determination section 163 determines whether the passenger returns to collect the item, based on the result of the determination made by the ride/egress determination section 160.

When the first determination section 162 determines that a left-behind item is present, the first command section 164 sends a command to the loudspeaker 114 to sound an alert. The first command section 164 continues to sound the alert until the second determination section 163 determines that the passenger has returned to collect the item, or until a predetermined period of time elapses.

1.1.3. Structure of Server 500

Next, the structure of the server 500 is explained with reference to FIG. 4A. FIG. 4A is a block diagram showing an exemplary hardware structure of the server 500. As illustrated in this drawing, the server 500 includes a controller 530 and a communication unit 580.

The communication unit 580 is a communication circuit that is connected to the network 600 by wireless or wired communication, and that can transmit and receive information via this network 600 through the vehicle 100, station 200, and smartphones 300 and 400. The communication unit 580 transfers the data received from the vehicle 100, station 200, and smartphones 300 and 400 to the controller 530, and transmits the data received from the controller 530 to the vehicle 100, station 200, and smartphones 300 and 400.

The controller 530 controls the process relating to an item left behind in the vehicle 100. The controller 530 includes a processor 531, a ROM 532, a RAM 533, and an input/output circuit 534. The ROM 532 and RAM 533 store programs to be implemented by the processor 531, and necessary data. The RAM 533 serves as a work area of the processor 531. The input/output circuit 534 controls the transmission/reception of information with respect to the communication unit 580. The processor 531 implements the programs stored in the ROM 532 and RAM 533. According to the present embodiment, the RAM 533 stores therein a comparison program 535. The RAM 533 also stores therein pre-ride data 536 and post-ride data 537. The pre-ride data 536 is image data taken, for example, by the sensors 106 before a passenger rides the vehicle 100. The pre-ride data 536 may be data that is imaged when the vehicle 100 is on standby at the station 200. The post-ride data 537 is image data taken by the sensors 106 immediately after the vehicle 100 arrives at the passenger's destination and the passenger egresses the vehicle 100. The pre-ride data 536 and post-ride data 537 are transmitted from the vehicle 100 to the server 500 and stored in the RAM 533. Alternatively, the pre-ride data 536 may be supplied from the information terminal of the station 200 to the server 500. By the comparison program 535 implemented by the processor 531, the server 500 executes a left-behind item handling operation.

FIG. 4B is a functional block diagram of the processor 531 when implementing the comparison program 535. The processor 531 that implements the program 535 functions as a data acquisition section 560, a comparison section 561, and a third determination section 563, as illustrated in FIG. 4B.

The data acquisition section 560 issues a command to the vehicle 100 to transmit the pre-ride data 536 to the server 500. In response to this command, the sensors 106 acquire the image data of the interior of the vehicle 100, and transmit this data to the server 500. The post-ride data 537 may equally be transmitted from the vehicle 100 to the server 500 in response to a command from the data acquisition section 560. The comparison section 561 compares the pre-ride data 536 with the post-ride data 537. The third determination section 563 determines whether any item is left behind, based on the comparison result obtained by the comparison section 561. That is, based on the difference between the pre-ride data (e.g., vehicle interior image data) 536 and the post-ride data (e.g., vehicle interior image data in the same area as the pre-ride data) 537, the third determination section 563 executes image recognition and image comprehension to determine whether any item is left behind in the vehicle after the passenger egresses. The third determination section 563 transmits the determination result to the vehicle 100. Based on the comparison result, the third determination section 563 may be configured to determine only whether or not there is any change (i.e., an item remaining) inside the vehicle 100; whether the item has been inadvertently left behind in the vehicle 100 may be determined by the first determination section 162 of the vehicle 100. Alternatively, the third determination section 563 may be configured to determine whether the article is an inadvertently left-behind item.

1.2. Operations

Figure 5:
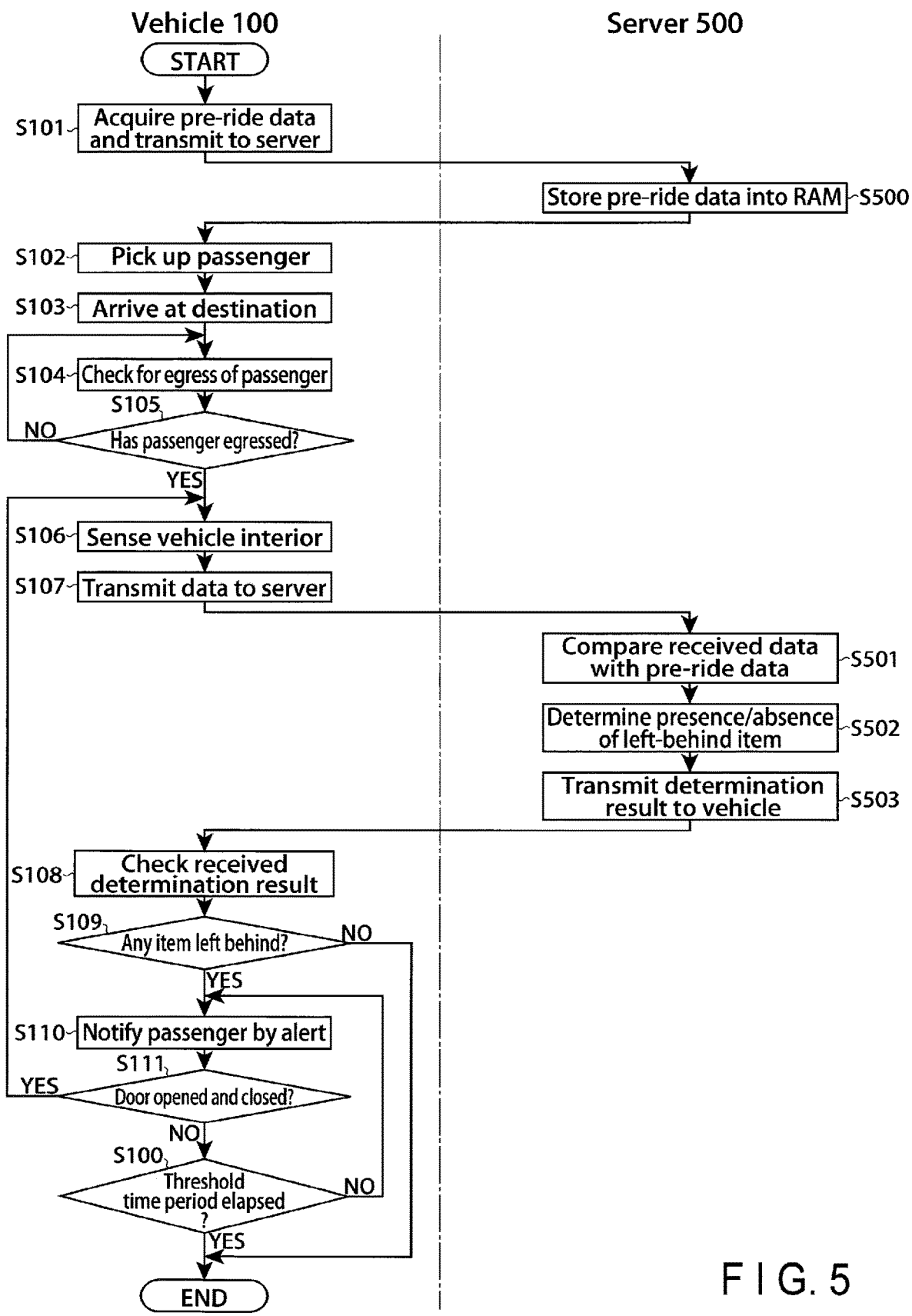
FIG. 5 is a flowchart indicating the process of the taxi operation system according to the first embodiment.

With regard to the process of the taxi operation system 1 having the above structure, the following explanation focuses on the left-behind item handling operation. FIG. 5 is a flowchart of the processing of the vehicle 100 and the server 500. In FIG. 5, the process of the vehicle 100 is based on the instruction from the processor 131 that implements the left-behind item program 135, while the process of the server 500 is based on the instruction from the processor 531 that implements the comparison program 535.

As illustrated in this drawing, first, the vehicle 100 acquires the pre-ride data 536 and transmits it to the server 500 (step S101). Then, the server 500 stores the received pre-ride data in the RAM 533 (step S500). This processing at step S101 is executed in response to a command from the data acquisition section 560 of the server 500, before a passenger rides the vehicle 100, as described earlier. Alternatively, the vehicle 100, which is on standby at the station 200 or cruising without any passenger, may autonomously acquire the pre-ride data 536. The pre-ride data 536 needs to be acquired by the sensors 106 before a passenger rides the vehicle 100, but this data may be transmitted from the vehicle 100 to the server 500 at any timing. That is, the transmission may be when the vehicle 100 is on standby at the station 200, when it is cruising without any passenger, or after a passenger gets into the vehicle 100. FIG. 6A provides an example of the pre-ride data 536, which is exemplary image data photographing the rear seat 102 of the vehicle 100. An image of the vehicle interior, or multiple images photographing multiple areas, are transmitted to the server 500.

Thereafter, a passenger rides the vehicle 100 (step S102). When the vehicle 100 arrives at the destination (step S103), the vehicle 100 confirms that the passenger has egressed (step S104). As described earlier, whether or not the passenger has egressed is determined by the ride/egress determination section 160 in accordance with the opening/closing of a door detected by the sensor 113. The ride/egress determination section 160 may determine that the passenger egresses when the sensor 113 detects the opening of the door 112 and the closing of the door 112 after the vehicle 100 arrives at the destination and is brought to a halt. The ride/egress determination section 160 may be configured to further determine that no passenger is in the vehicle, not only based on the opening/closing of the door but also on the image acquired by the sensors 106.

When the ride/egress determination section 160 confirms that the passenger has egressed ("yes" at step S105), the vehicle 100 starts sensing the vehicle interior (step S106). That is, the sensing section 161 issues a command to the sensors 106 to acquire the image data of the vehicle interior. Then, the sensing section 161 transmits image data (post-ride data 537) acquired at step S106 to the server 500 (step S107). FIG. 6B provides an example of the post-ride data 537, which is exemplary image data, photographing the area of the rear seat 102 of the vehicle 100 corresponding to FIG. 6A. An image of the vehicle interior, or multiple images photographing multiple areas, are transmitted to the server 500 in the same manner as the pre-ride data 536.

Next, the comparison section 561 of the server 500 compares the pre-ride data 536 with the post-ride data 537 transmitted at step S107 (step S501). Based on the comparison result obtained at step S501, the third determination section 563 of the server 500 determines the presence/absence of an item left behind (step S502), and transmits the result to the vehicle 100 (step S503). That is, when comparing FIG. 6A with FIG. 6B, a bag 120 not previously present before the passenger's ride remains in the rear seat 102 after the passenger's ride. If this is the case, the third determination section 563 detects the presence of the bag 120 and determines that there is a left-behind item.

In the vehicle 100, the first determination section 162 checks the determination result received from the server 500 (step S108). If no item is left behind based on this result ("no" at step S109), the process is terminated. As mentioned earlier, the first determination section 162 may determine the presence/absence of a left-behind item 120 based on the determination result received at step S503 as it is. Alternatively, the determination of the presence or absence of a left-behind item 120 may be made by modifying the received determination result (e.g., assigning weights to percentages) and executing further processing. On the other hand, if it is determined that an item is left behind ("yes" at step S109), the first command section 164 sends a command to the loudspeaker 114 to sound an alert (step S110). The alert notifies the passenger who has already egressed the vehicle of an item left behind in the vehicle. The situation is illustrated in FIG. 6C.

During the period of the loudspeaker 114 sounding the alert, the second determination section 163 of the vehicle 100 determines whether the passenger returns to the vehicle 100 to collect the item (step S111). In particular, if the sensor 113 detects the opening/closing of the door 112, it is determined that the passenger has returned to the vehicle 100. When the passenger returns to the vehicle 100 and the door is opened and closed ("yes" at step S111), the vehicle 100 again senses the vehicle interior (step S106) so that the server 500 can determine the presence/absence of a left-behind item (steps S501 and S502). These operations are repeated for a threshold time period (step S100).

If the passenger collects the item, and therefore the third determination section 563 of the server 500 determines that no item is left behind, or if the item still remains in the vehicle but the threshold time period has elapsed ("yes" at step S100), the process is terminated. The process for handling an item remaining in the vehicle will be discussed in the second embodiment.

1.3. Effects of Present Embodiment

According to the present embodiment, an autonomous driving vehicle can offer high-quality services, as described above. This effect is explained below.

According to the present embodiment, the vehicle 100 is provided with sensors 106 for imaging the vehicle interior, and a sensor 113 for detecting a passenger who is riding and egressing. Furthermore, the server 500 determines the presence/absence of any left-behind item immediately after the passenger egresses, based on the image data of the vehicle interior before the passenger's ride and the image data after the passenger egresses. If there is a left-behind item, the vehicle 100 notifies the passenger accordingly by sounding an alert.

The checking for any left-behind item, which used to be conducted by the driver, can be conducted by the sensor of the vehicle 100 and the processor of the server 500. For this reason, even if the autonomous driving technique at Level 4 or 5, where no driver is present in the vehicle, is applied to the passenger automobile transportation business such as taxi business, the technique can still draw the attention of the passenger to any left-behind belongings.

According to the present embodiment, the process for determining the presence/absence of a left-behind item (steps S501 to 503) is implemented by the server 500, as explained with reference to FIG. 5. The process, however, may be implemented by the processor 131 of the vehicle 100, instead. If this is the case, the processor 131 further functions as the comparison section 561 and the third determination section 563.

The notification of a left-behind item is not limited to an alert sounded by the loudspeaker 114. The notification of a left-behind item may be made by automated voice, by both alert sounding and automated voice, or by any method that can draw attention of the passenger.

2. Second Embodiment

An information processing device, information processing method, and information processing program according to the second embodiment are explained. The present embodiment is directed to a situation where the passenger in the first embodiment does not become aware of the alert sounding. The following explanation will focus only on the points that differ from the first embodiment.

2.1. Structure

FIG. 7 shows an exemplary structure of a taxi operation system according to the present embodiment. The system 1 according to the present embodiment differs from FIG. 1 of the first embodiment in that the server 500 is connected to a server 700 via a bus 800. The server 700 stores a passenger database therein. A user database will be described later.

Figure 8A:
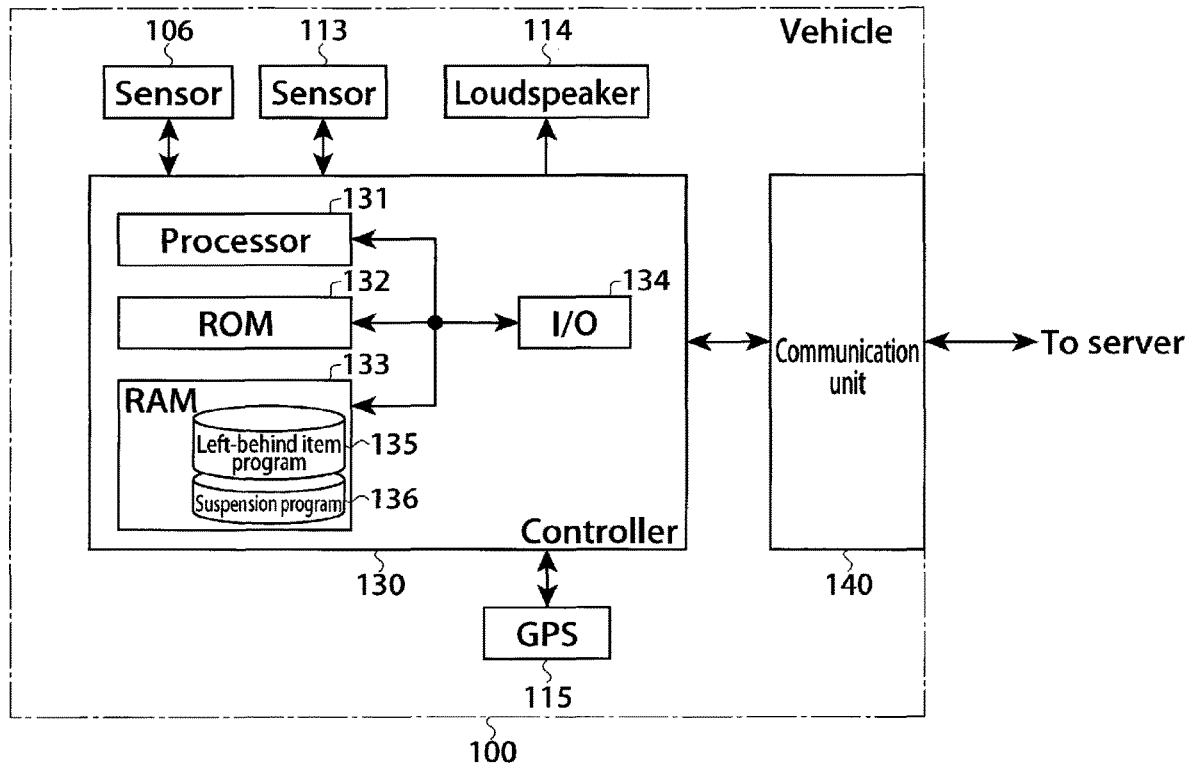
FIG. 8A is a block diagram of the taxi according to the second embodiment.
Figure 8B:
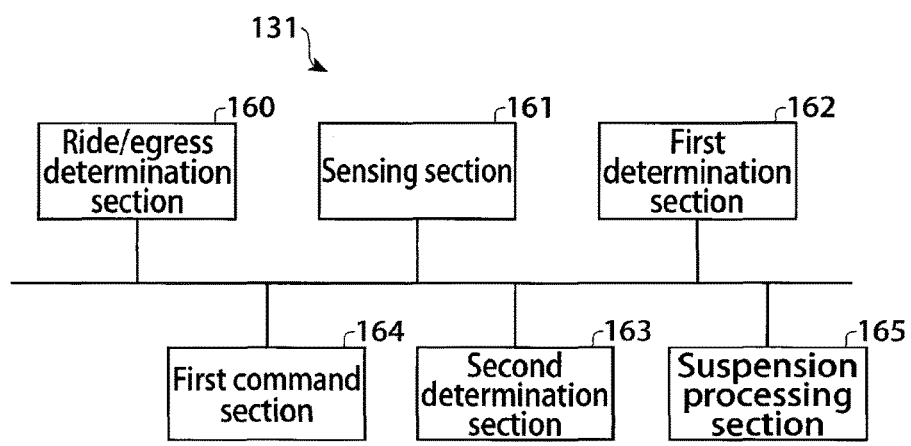
FIG. 8B is a functional block diagram of the processor of the taxi according to the second embodiment.

The structure of the vehicle 100 according to the present embodiment is explained with reference to FIGS. 8A and 8B. FIG. 8A is a block diagram showing an exemplary hardware structure of the vehicle 100, and FIG. 8B is a functional block diagram of the processor 131. They correspond to FIGS. 3A and 3B, respectively, of the first embodiment.

As illustrated in FIG. 8A, the vehicle 100 includes a global positioning system (GPS) receiver 115 in the structure of FIG. 3A. The GPS receiver 115 receives signals from GPS satellites and thereby acquires the location of the vehicle 100. The RAM 133 includes a suspension program 136, in addition to the left-behind item program 135. By implementing this suspension program 136, the processor 131 further functions as a suspension processing section 165, as illustrated in FIG. 8B. The suspension processing section 165 executes a process when a left-behind item remains in the vehicle 100. In the present example, the left-behind item program 135 and the suspension program 136 are indicated as different programs, but may be integrated into a single program.

The structure of the server 500 according to the present embodiment is explained with reference to FIGS. 9A and 9B. FIG. 9A is a block diagram showing an exemplary hardware structure of the server 500, and FIG. 9B is a functional block diagram of the processor 531. They correspond to FIGS. 4A and 4B, respectively, of the first embodiment.

As indicated in FIG. 9A, the RAM 533 of the server 500 includes a user database 538, station information 539, and a suspension program 540 in addition to the structure of FIG. 4A. By implementing the suspension program 540, the processor 531 further functions as a search section 564, a message transmitter 565, an arrival information notification section 566, and a suspension processing section 567, as indicated in FIG. 9B. In the present example, the suspension program 540 and the comparison program 535 may be integrated into a single program.

The user database 538 may be read from the server 700 into the server 500, where it is stored in the RAM 533. An example of the user database 538 is shown in FIG. 9C. In the user database 538, the contact numbers of users, i.e., e-mail addresses in this example, are entered as shown in FIG. 9C. In addition to e-mail addresses, private information including contact phone numbers, home addresses, and workplaces, as well as information including frequent taxi destinations, may also be entered. The station information 539 holds positional information of multiple stations 200. In addition to the positional information, information relating to business hours and available facilities of the stations 200 may also be included. The suspension program 540 is implemented when a left-behind item remains in the vehicle 100.

In FIG. 9B, the search section 564 searches for the nearby station 200 based on the positional information of the vehicle 100 and the station information 539. The message transmitter 565 produces and transmits various messages to the smartphones 300 and 400 and to the information terminal of the stations 200. In the left behind item handling operation, the arrival information notification section 566 notifies the smartphones 300 and 400 as well as the information terminal of the stations 200 that the vehicle 100 has arrived at the destination. The suspension processing section 567 performs the main role in the left-behind item handling operation on the server 500.

2.2. Operations

Next, with the process of the taxi operation system 1 having the above structure, the following explanation focuses on a passenger A who has left his/her belongings behind in the vehicle 100. FIG. 10 is a flowchart of the process of the vehicle 100, the server 500, and the smartphone 300. In FIG. 10, the process of the vehicle 100 is based on the instructions from the processor 131, which implements the left-behind item program 135 and the suspension program 136. The process of the server 500 is based on the instructions from the processor 531, which implements the comparison program 535 and the suspension program 540.

As a result of the process of FIG. 5 explained in the first embodiment, if the left-behind item still remains in the vehicle after the threshold time period elapses (step S112), the first determination section 162 of the vehicle 100 may notify the server 500 accordingly (step S113).

Upon receipt of the notification, the processor 531 of the server 500 implements the suspension program 540. Furthermore, the message transmitter 565 may create a message providing notification a left-behind item, and send the message to the smartphone 300 of the passenger A with reference to the user database 538 (step S504).

Figure 11A:
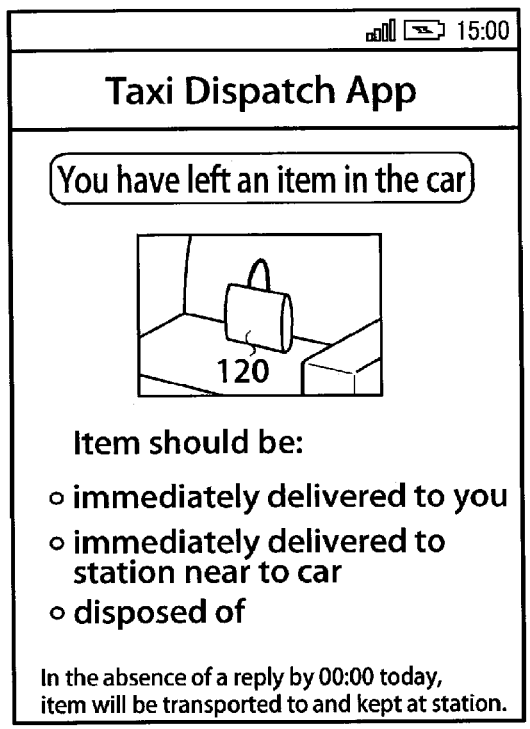
FIG. 11A is a schematic diagram of an exemplary display screen of a user's terminal according to the second embodiment.

Upon receipt of the message from the server 500, the smartphone 300 displays a screen as illustrated in FIG. 11A. FIG. 11A is a schematic diagram showing an example of the displayed screen of the smartphone 300. As illustrated in this drawing, an image of the left-behind item is attached to the message notifying of the left-behind item. In the present example, an image of the bag 120, which is the left-behind item, is enlarged from the image of FIG. 6B and attached to the message. The smartphone 300 further displays a message that prompts the passenger A to select an option for handling the left-behind item. That is, the smartphone 300 prompts the passenger A to select a delivery of the left-behind item to the passenger A, temporary storage at the nearby station 200, or disposal of the item. The smartphone 300 receives the selection made by the passenger A regarding the handling of the left-behind item (step S301). This selection information is transmitted from the smartphone 300 to the server 500.

In the server 500, upon receipt of the selection information, the suspension processing section 567 issues a command for suspension of the operation to the vehicle 100. Furthermore, based on the information selected at step S301, the suspension processing section 567 issues a command to the vehicle 100 to drive towards the item collection location, and also transmits to the information terminal of the station 200 the content of step S301 and the current state of the vehicle 100 (step S505).

Figure 11B:
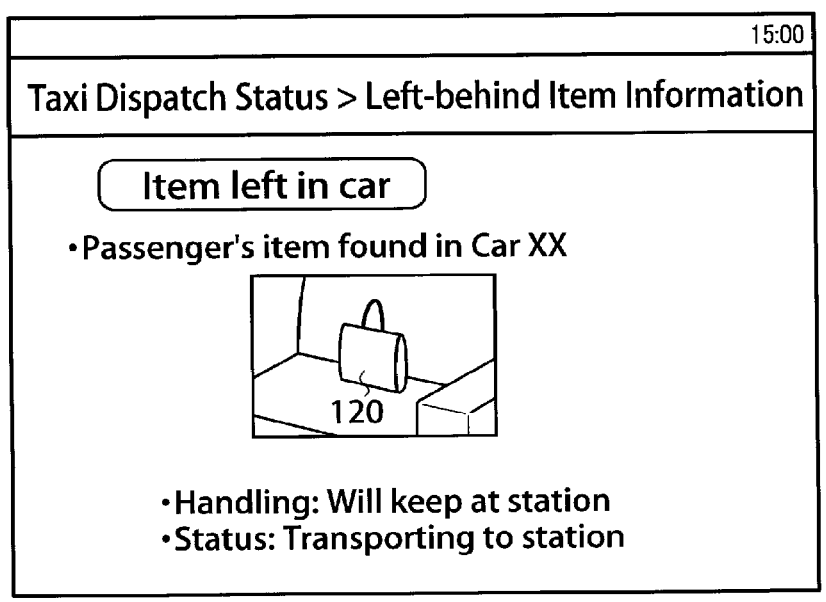
FIG. 11B is a schematic diagram of an exemplary display screen of a station terminal according to the second embodiment.

An exemplary screen displayed on the information terminal of the station 200 that receives the information at step S505 is illustrated in FIG. 11B. As illustrated in this drawing, the information terminal of the station 200 displays information including an item that has been left behind, the in-service vehicle in which the item has been left, the handling selected by the passenger (collecting at the station 200 in the example of FIG. 11B), and the current state of the vehicle 100 (currently moving to the station 200 in the example of FIG. 11B). In this manner, each station 200 can acquire the state of each vehicle 100.

In the vehicle 100, upon receipt of the in-service operation suspension command from the server 500, the processor 131 implements the suspension program 136. The vehicle 100 thereby suspends the in-service driving operation as a taxi. In response to the move command from the server 500, the vehicle 100 moves to the item collection location (step S114).

Next, as specific examples of the above operations, the case of the passenger A selecting the collection of the left-behind item at the nearby station 200, and the case of the passenger A selecting the immediate delivery to the passenger A are explained.

Collection at Station 200

Figure 12:
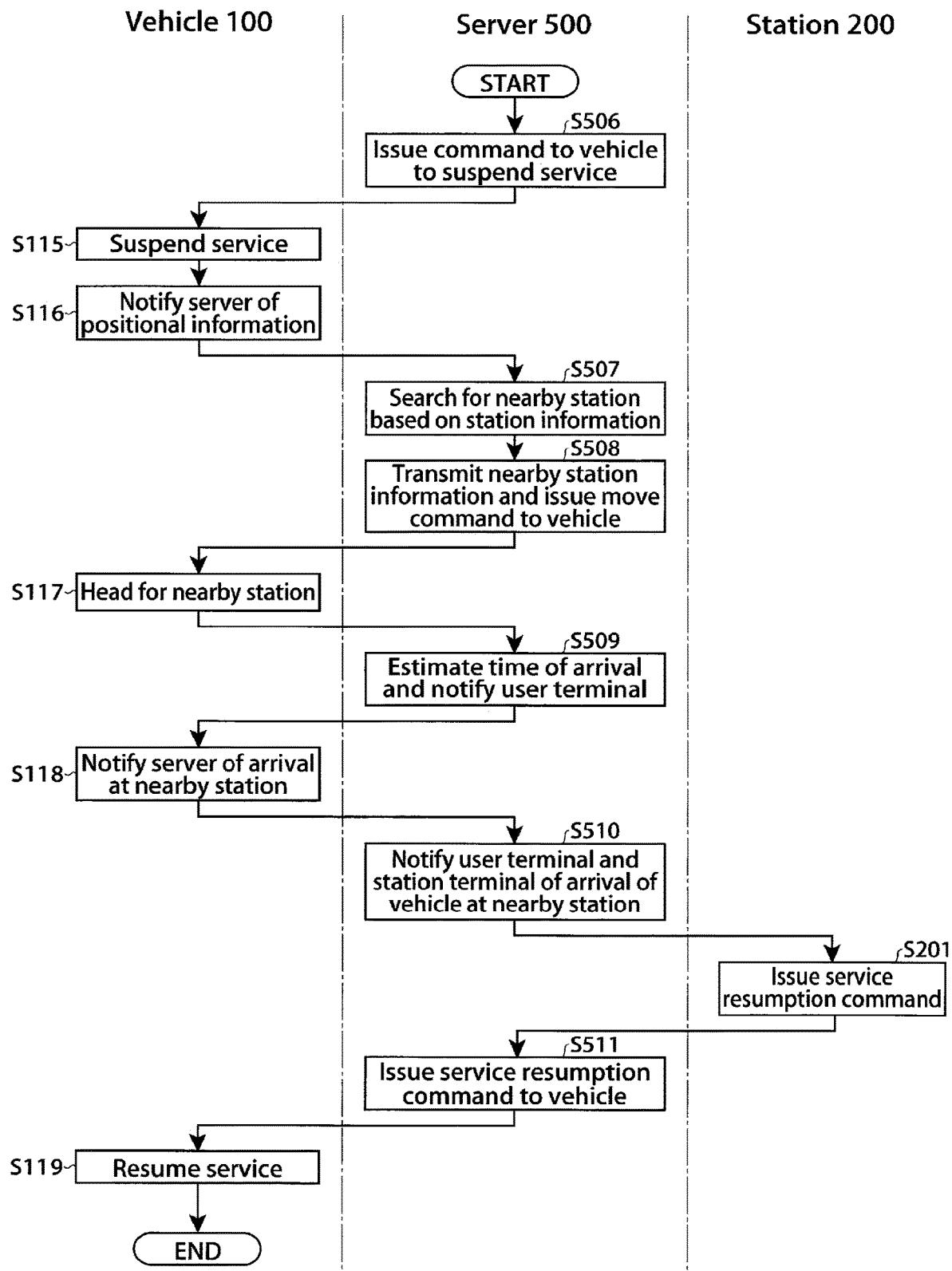
FIG. 12 is a flowchart of the process of the taxi operation system according to the second embodiment.

First, the case of selecting the collection at the nearby station 200 is explained with reference to FIG. 12. FIG. 12 is a flowchart of the process of the vehicle 100, the server 500, and the station 200. In particular, the operations at steps S505 and S114 in FIG. 10 are described in detail.

As illustrated, first, the suspension processing section 567 of the server 500 issues an in-service operation suspension command to the vehicle 100 (step S506). Then, the suspension processing section 165 of the vehicle 100 suspends the in-service driving operation (step S115). Specifically, the vehicle 100 is placed into the state of not accepting the next passenger.

Thereafter, the suspension processing section 165 of the vehicle 100 transmits the current positional information of the vehicle 100 to the server 500 based on the information acquired by the GPS receiver 115 (step S116). This positional information may be stored in the RAM 533 of the server 500. Based on the received positional information and the station information 539 stored in the RAM 533, the search section 564 of the server 500 searches for the station 200 currently closest to the vehicle 100 (step S507). Furthermore, the suspension processing section 567 transmits, together with the positional information of the nearby station 200 found at step S507, a move command to the vehicle 100 to move to this station 200 (step S508).

Upon receipt of the move command, the vehicle 100 heads for the nearby station 200 while carrying the left-behind item of the passenger A, under the control of the suspension processing section 165 (step S117). The suspension processing section 567 of the server 500 estimates the time of arrival of the vehicle 100 at the nearby station 200, and notifies the smartphone 300 of the passenger A and the information terminal of the station 200 of the resultant time (step S509). The screens displayed on the smartphone 300 and the information terminal of the station 200 that have received this notification are illustrated in FIG. 13A and FIG. 13B.

Figure 13A:
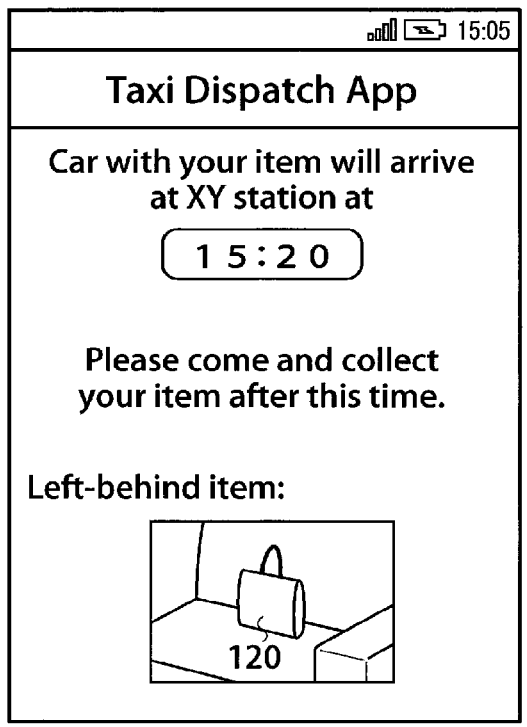
FIG. 13A is a schematic diagram of an exemplary display screen of the user's terminal according to the second embodiment.
Figure 13B:
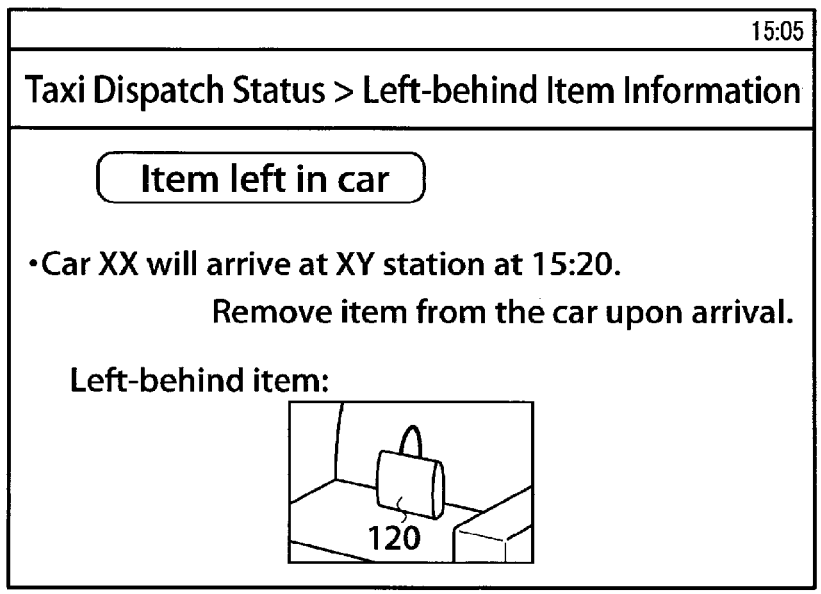
FIG. 13B is a schematic diagram of an exemplary display screen of the station terminal according to the second embodiment.

As illustrated in FIG. 13A, the smartphone 300 displays the notification of the arrival of the vehicle 100 at the XY station at 15:20 and a message requesting a collection after this point in time, together with the image of the left-behind item (bag 120). In addition, as illustrated in FIG. 13B, the information terminal of the station 200 displays similar information, along with a message to the staff of the station 200 requesting removal of the left-behind item from the vehicle 100.

Figure 13C:
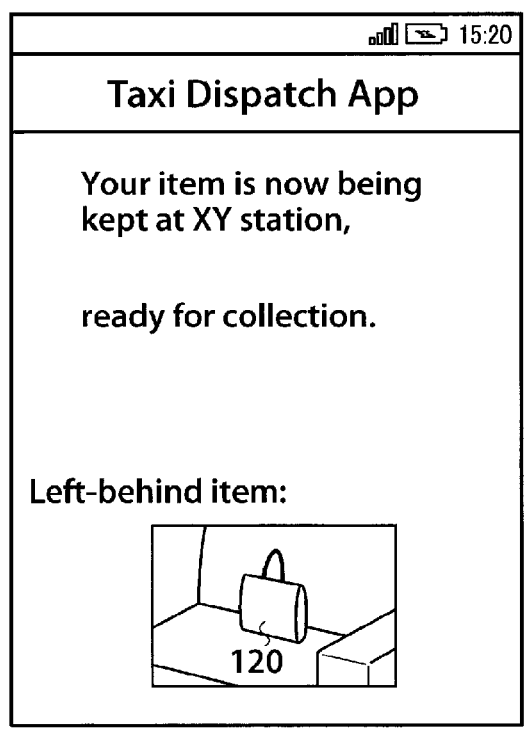
FIG. 13C is a schematic diagram of an exemplary display screen of the user's terminal according to the second embodiment.

When the vehicle 100 arrives at the nearby station 200, the suspension processing section 165 of the vehicle 100 notifies the server 500 accordingly (step S118). Then, the arrival information notification section 566 of the server 500 performs a transmission to the smartphone 300 of the passenger A regarding the vehicle 100 having arrived at the nearby station 200 (step S510). An exemplary display screen of the smartphone 300 in this example is illustrated in FIG. 13C.

Thereafter, the suspension processing section 567 of the server 500 transmits an operation resumption command to the vehicle 100 (step S511), in response to which the suspension processing section 165 of the vehicle 100 terminates the suspension process and resumes the in-service driving operation (step S119). Here, the staff of the station 200 may input, to the information terminal of the station 200, information of the left-behind item having been removed from the vehicle 100. The information terminal then transmits this information and the operation resumption command to the server 500 (step S201). Upon receipt by the server 500, the suspension processing section 567 may transmit the operation resumption command. This is merely an example of a trigger for the suspension processing section 567 to transmit an operation resumption command, which is not a limitation. For instance, the process may not need to be mediated by the staff of the station 200. That is, the information terminal of the station 200 or the vehicle 100 may be configured to automatically transmit a command to the server 500 to request the operation resumption when a predetermined period of time elapses after the arrival of the vehicle 100 at the station 200. The settings may be suitably determined.

Delivery to Passenger A

Figure 14:
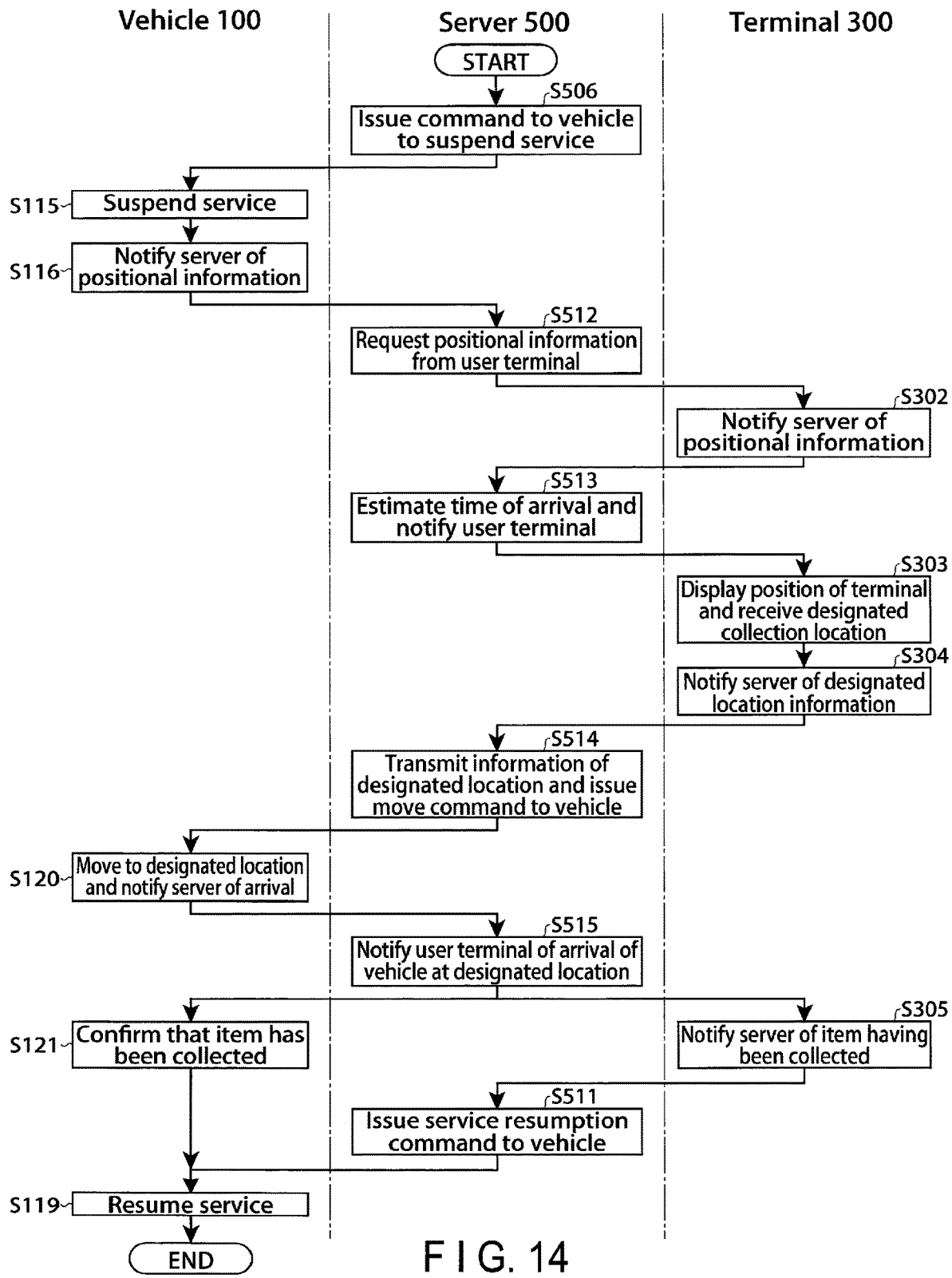
FIG. 14 is a flowchart of the process of the taxi operation system according to the second embodiment.

Next, the case of the passenger A selecting the immediate delivery to him/herself is described. FIG. 14 is a flowchart of the process of the vehicle 100, the server 500, and the smartphone 300 of the passenger A. In a manner similar to FIG. 12, the operations of steps S505 and S114 in FIG. 10 are described in detail.

As shown in this drawing, in a manner similar to FIG. 12, the operations of steps S506, S115, and S116 are executed first. Thereafter, the suspension processing section 567 requests positional information from the smartphone 300 (step S512). In response to this request, the smartphone 300 transmits the positional information to the server 500, based on the GPS function of the smartphone 300 (step S302). This positional information may be stored in the RAM 533 of the server 500.

Based on the positional information of the vehicle 100 received at step S116 and the positional information of the smartphone 300 received at step S302, the suspension processing section 567 of the server 500 estimates the time of arrival of the vehicle 100 at the passenger A, and notifies the smartphone 300 (step S513). Upon receipt of this notification, the smartphone 300 displays the current position of the smartphone 300 on the display section, and further displays a screen that prompts the user of the smartphone 300 (generally the passenger A but possibly a person related to the passenger A) to designate a collection location in the vicinity of the current position (step S303). An exemplary display screen of the smartphone 300 in this instance is illustrated in FIG. 15A. In FIG. 15A, as a collection location, the user of the smartphone 300 designates "Apartment X" located near the current position, and the smartphone 300 receives this designation. The smartphone 300 further receives the selection by a confirmation button on the display screen from the user, and thereby transmits the collection location information to the server 500 (step S304). This information may be stored in the RAM 533.

Thereafter, the suspension processing section 567 of the server 500 transmits, to the vehicle 100, the positional information of the collection location received at step S304 and a move command to move to this collection location (step S514).

Upon receipt of the move command, the vehicle 100 heads for the designated collection location with the left-behind item of the passenger A carried, under the control of the suspension processing section 165 (step S120). When the vehicle 100 arrives at the collection location, the suspension processing section 165 notifies the server 500 accordingly (step S120). Furthermore, the arrival information notification section 566 of the server 500 notifies the smartphone 300 of the arrival of the vehicle 100 at the collection location (step S515). When the passenger A collects the left-behind item, the smartphone 300 notifies the server 500 accordingly (step S305). An exemplary display screen of the smartphone 300 at step S305 is illustrated in FIG. 15B. As illustrated in this drawing, upon receipt of the selection by the confirmation button on the display screen, the smartphone 300 acknowledges that the left-behind item has been collected by the passenger A (or his/her substitute). The vehicle 100 also acknowledges the fact that the left-behind item has been collected (step S121). The operation at step S121 may be realized by the method explained in the first embodiment. In particular, after the detection of the opening and closing of the door 112 ("yes" at step S105 in FIG. 5), the image data of the vehicle interior is acquired so that this image data can be compared with the pre-ride data.

Upon receipt of the notification from the smartphone 300, the suspension processing section 567 of the server 500 transmits an operation resumption command to the vehicle 100 (step S511), in response to which the suspension processing section 165 of the vehicle 100 terminates the suspension process and resumes the in-service driving operation (step S119). The operation at step S511 may be implemented only after it is acknowledged at step S121 that the left-behind item has actually been removed from the vehicle interior.

Figure 15C:
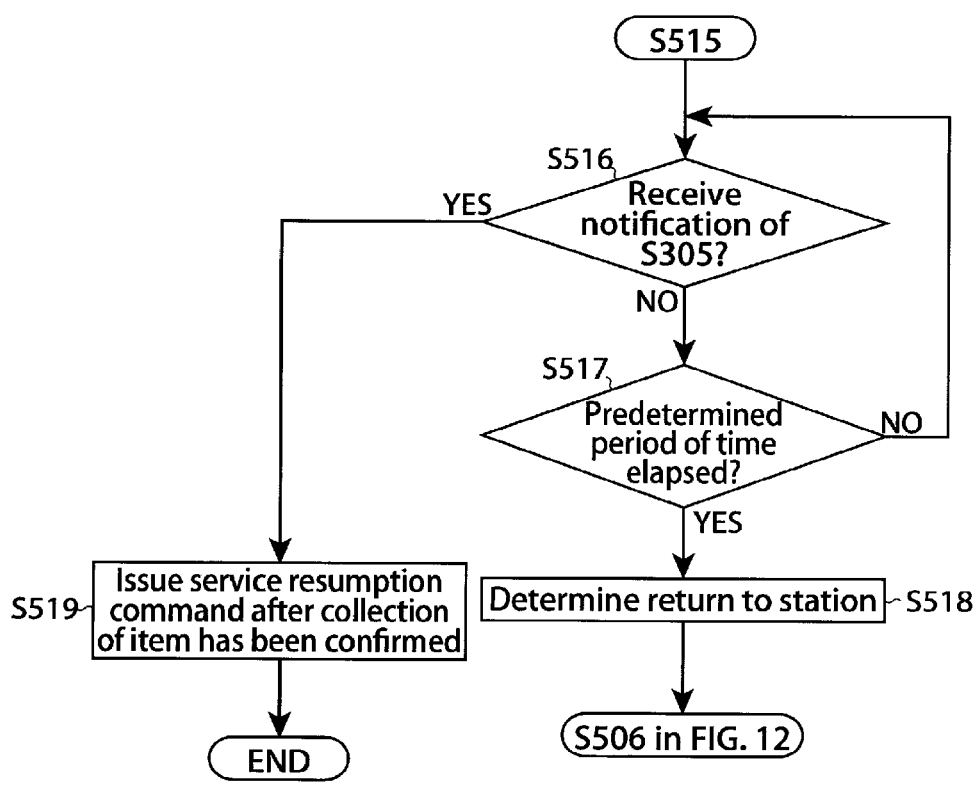
FIG. 15C is a flowchart of the operation of the server according to the second embodiment.

In case the passenger who has designated the collection location for the left-behind item in FIG. 14 does not appear to collect it, the vehicle 100 may return to the station after waiting at the designated spot for a predetermined period of time, or may resume the operation directly after. Another example of the operation of the server 500 corresponding to steps S515 to S511 in FIG. 14 is shown in FIG. 15C.

As illustrated in this drawing, after step S515, without any notification of collection of the left-behind item (step S305) from the smartphone 300 to the server 500 ("no" at step S516), after a predetermined period of time has elapsed ("yes" at step S517), the suspension processing section 567 determines to send the vehicle 100 to the nearby station 200 and have the left-behind item kept in this station 200 (step S518). That is, the operations of steps S506 and after in FIG. 12 are implemented.

On the other hand, if the server 500 receives a notification from the smartphone 300 ("yes" at step S516) before a predetermined period of time elapses ("no" at step S517), the comparison section 561 and the third determination section 563 of the server 500 acknowledge that the left-behind item is no longer present, based on the image data of the vehicle interior transmitted from the vehicle 100, and issue a command to the vehicle 100 to resume the in-service operation (step S519).

The determination operation at step S516 may not have to be based on the notification from the smartphone 300, but instead may be based on the image data obtained from the vehicle 100, determining whether or not the disappearance of the left-behind item from the vehicle interior can be acknowledged. In particular, when the passenger arrives at the designated spot, opens the door 112 of the vehicle 100, collects the left-behind item, and then closes the door 112, the sensor 113 detects the opening and closing of this door. Based on this, the ride/egress determination section 160 determines that the passenger has come to collect the left-behind item. Based on the result of this determination, the sensing section 161 issues a command to the sensor 113 to take an image of the vehicle interior, and transmits the acquired image data to the server 500. In comparison of this image data with the pre-ride data, the third determination section 563 determines that there is no item left behind. If this is the case, the server 500 transmits a command to the vehicle 100 to resume the in-service operation. A notification from the smartphone 300 at step S305 may be required to resume the operation.

In case the passenger does not come to collect the left-behind item, any measurement other than the above may be adopted.

2.3. Effects of Present Embodiment

As discussed above, according to the present embodiment, even if the passenger who has left an item behind does not notice an alert sound in the first embodiment, the left-behind item can be delivered to the passenger. If it is found that an item is left behind in the vehicle interior, the server 500 immediately suspends the service of the vehicle 100, and sends the vehicle 100 to the collection location in accordance with the passenger's request. Thus, the operator of the taxi business can considerably reduce the operations requiring manpower.

In the above embodiment, an example of the collection location for the left-behind item being at the station 200 or in the vicinity of the current position of the passenger A has been explained. The collection location, however, may be designated by the passenger A as he/she desires. In particular, at step S303 of FIG. 14 and in FIG. 15A, the smartphone 300 and the server 500 may be configured to receive selection of any spot that is not in the vicinity of the passenger A (smartphone 300), and to further receive a collection time point.

The vehicle 100 may continue the service while carrying the left-behind item. This example will now be explained. When it is assumed that the vehicle 100 is scheduled to carry a passenger B after carrying the passenger A, the server 500 displays, at steps S504 and S301 in FIG. 10, a confirmation screen on the display section of the smartphone 300 to confirm whether or not the left-behind item may be carried together with the passenger B. If the smartphone 300 receives an input that the item may be carried, the server 500 searches for a route and notifies the smartphone 300 of the time required to deliver the left-behind item to the passenger A. The server 500 further displays, for the passenger B, a confirmation screen to confirm whether the vehicle 100 carrying a left-behind item may be dispatched, on the display section of the smartphone 400 of the passenger B. If the passenger B declines the dispatch of the vehicle 100 carrying the left-behind item, the server 500 looks for another possible passenger and repeats the above process. For the passenger B, another vehicle 100, which is not carrying a left-behind item, is dispatched.

The smartphone 300 receives an input of acceptance of the vehicle carrying a left-behind item and this information is transmitted to the server 500. Then, the server 500 displays a confirmation screen on the smartphone 400 to confirm whether or not the left-behind item can be delivered to the passenger A before carrying the passenger B to his/her destination.

If the smartphone 400 receives the input of delivering the left-behind item to the passenger A first, the server 500 issues a command to the vehicle 100 in accordance with this notification to head for the collection location of the left-behind item for the passenger A. When the vehicle 100 arrives at the collection location, this information is transmitted from the server 500 to the smartphone 300 so that the passenger A can collect the left-behind item. The vehicle 100 and the server 500 conduct the in-vehicle sensing, thereby confirming whether or not the left-behind item has been collected. The result of the in-vehicle sensing is displayed on the instrumental panel 103 or on the display arranged on the aforementioned backrest or armrest of the front seats 101 of the vehicle 100, and further displayed on the display section of the smartphone 300 of the passenger A. When a validation operation is received from the passenger A on the instrumental panel 103 or the display in the vehicle 100 or on the smartphone 300 (e.g., the confirmation button being selected or a signature input with a stylus pen), the validation result is transmitted to the server 500. The server 500 issues a command to the vehicle 100 to terminate the display of the result of the in-vehicle sensing, transmits the destination information of the passenger B, and issues a command to head for the destination.

On the other hand, if the smartphone 400 receives an input that the left-behind item should be delivered later (after carrying the passenger B to the destination), the server 500 transmits, in accordance with this notification, the destination information of the passenger B to the vehicle 100 and issues a command to head for the destination. After the vehicle 100 arrives at the destination of the passenger B where the passenger B egresses, the vehicle 100 performs in-vehicle sensing and transmits the image data of the vehicle interior to the server 500. Based on the received image data and the image data of the vehicle interior after the passenger A has egressed, the server 500 confirms whether or not the passenger B has left an item behind. In case the passenger B has left some item behind, an alert is sounded as explained in the first embodiment. In case the passenger B does not notice the sound, the present embodiment is equally applied to the passenger B. If it is confirmed that the passenger B has left nothing behind, the server 500 transmits to the vehicle 100 the positional information of the collection location of the left-behind item for the passenger A, and issues a command to head for the collection location. The same process is conducted afterwards, and the process is terminated when the passenger A receives the left-behind item, and a validation operation is received from the passenger A.

3. Third Embodiment

An information processing device, information processing method, and information processing program according to the third embodiment are explained. The present embodiment is directed to a situation where a passenger soils the interior of the vehicle in the first or second embodiment. The following explanation will focus only on the points that differ from the first and second embodiments.

3.1. Structure

Figure 16A:
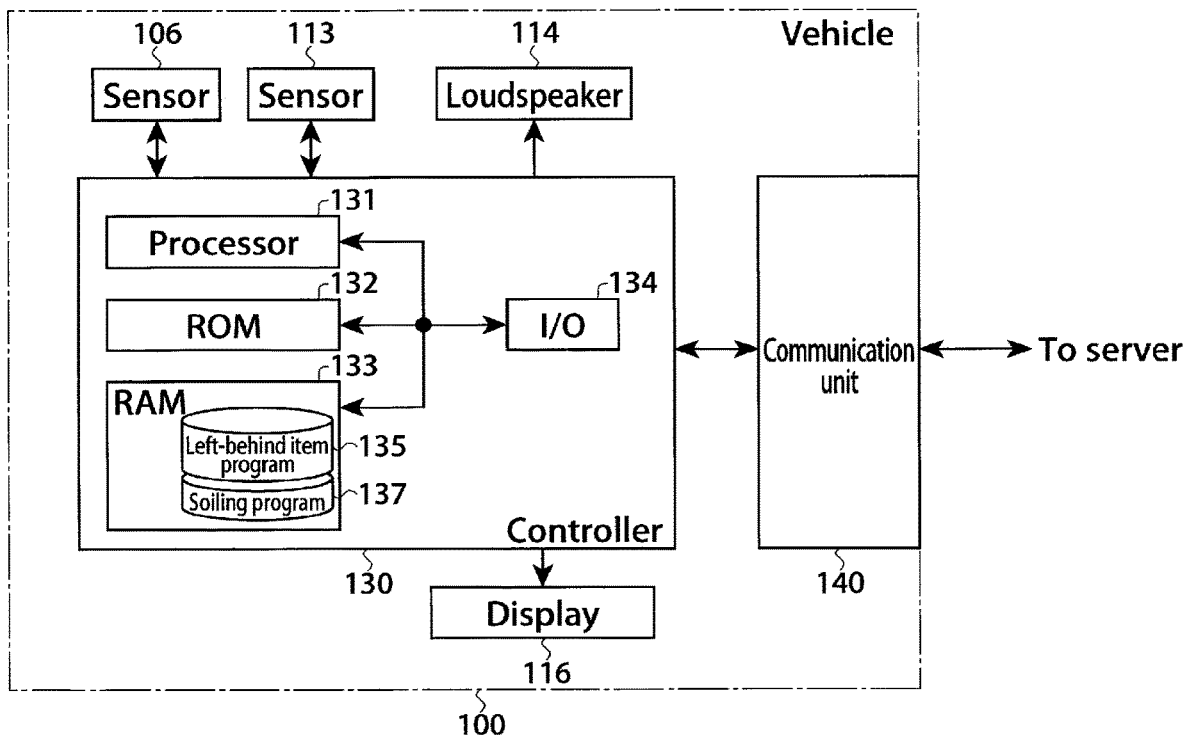
FIG. 16A is a block diagram of a taxi according to the third embodiment.
Figure 16B:
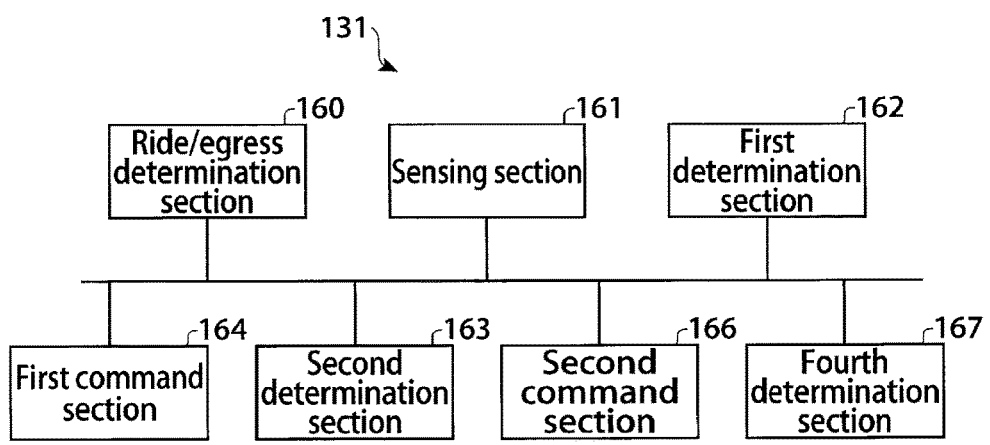
FIG. 16B is a functional block diagram of the processor of the taxi according to the third embodiment.

The structure of the vehicle 100 according to the present embodiment is explained with reference to FIGS. 16A and 16B. FIG. 16A is a block diagram showing an exemplary hardware structure of the vehicle 100, and FIG. 16B is a functional block diagram of the processor 131. They correspond to FIGS. 3A and 3B, respectively, of the first embodiment.

As illustrated in FIG. 16A, the vehicle 100 includes a display 116 in the structure of FIG. 3A. The display 116 may be part of the instrumental panel 103 explained in the first and second embodiments, or may be a display arranged on the back side of the backrest of the front seat or an armrest. In addition to the left-behind item program 135, the RAM 133 includes a soiling program 137. By implementing this soiling program 137, the processor 131 further functions as a second command section 166 and a fourth determination section 167 as illustrated in FIG. 16B. Upon receipt of the command from the server 500, the second command section 166 issues a command to the display 116 to display a request for cleaning the interior of the vehicle by the passenger if the interior of the vehicle is soiled. Based on the information received from the server 500, the fourth determination section 167 determines whether there is any soiling in the vehicle. The fourth determination section 167 may determine whether or not information indicating soiling in the interior of the vehicle is received from the server 500. In the present example, the left-behind item program 135 and the soiling program 137 are illustrated as different programs, but may be integrated into a single program. The program may also be integrated with the suspension program 136.

The structure of the server 500 according to the present embodiment is explained with reference to FIGS. 17A and 17B. FIG. 17A is a block diagram showing an exemplary hardware structure of the server 500, and FIG. 17B is a functional block diagram of the processor 531. They correspond to FIGS. 4A and 4B, respectively, of the first embodiment.

As illustrated in FIG. 17A, the RAM 533 of the server 500 further includes a soiling determination program 541 in addition to the structure of FIG. 4A. By implementing the soiling determination program 541, the processor 531 further functions as a fifth determination section 568, as illustrated in FIG. 17B. The fifth determination section 568 determines whether there is any soiling, based on the comparison result obtained by the comparison section 561. That is, based on the difference between the pre-ride data 536 and the post-ride data 537, the fifth determination section 568 executes image recognition and image comprehension to determine whether there is any soiling present in the interior of the vehicle after the passenger egresses. The fifth determination section 568 transmits the determination result to the vehicle 100. The fifth determination section 568 may be configured to only determine, based on the comparison result, whether or not there is any change in the interior of the vehicle 100 so that whether or not it is soiling may be determined by the fourth determination section 167 of the vehicle 100. Alternatively, the fifth determination section 568 may be configured to determine whether it is soiling. In the present example also, the soiling determination program 541 and the comparison program 535 may be integrated into a single program. The suspension program 540 may also be integrated.

3.2. Operations

Figure 18:
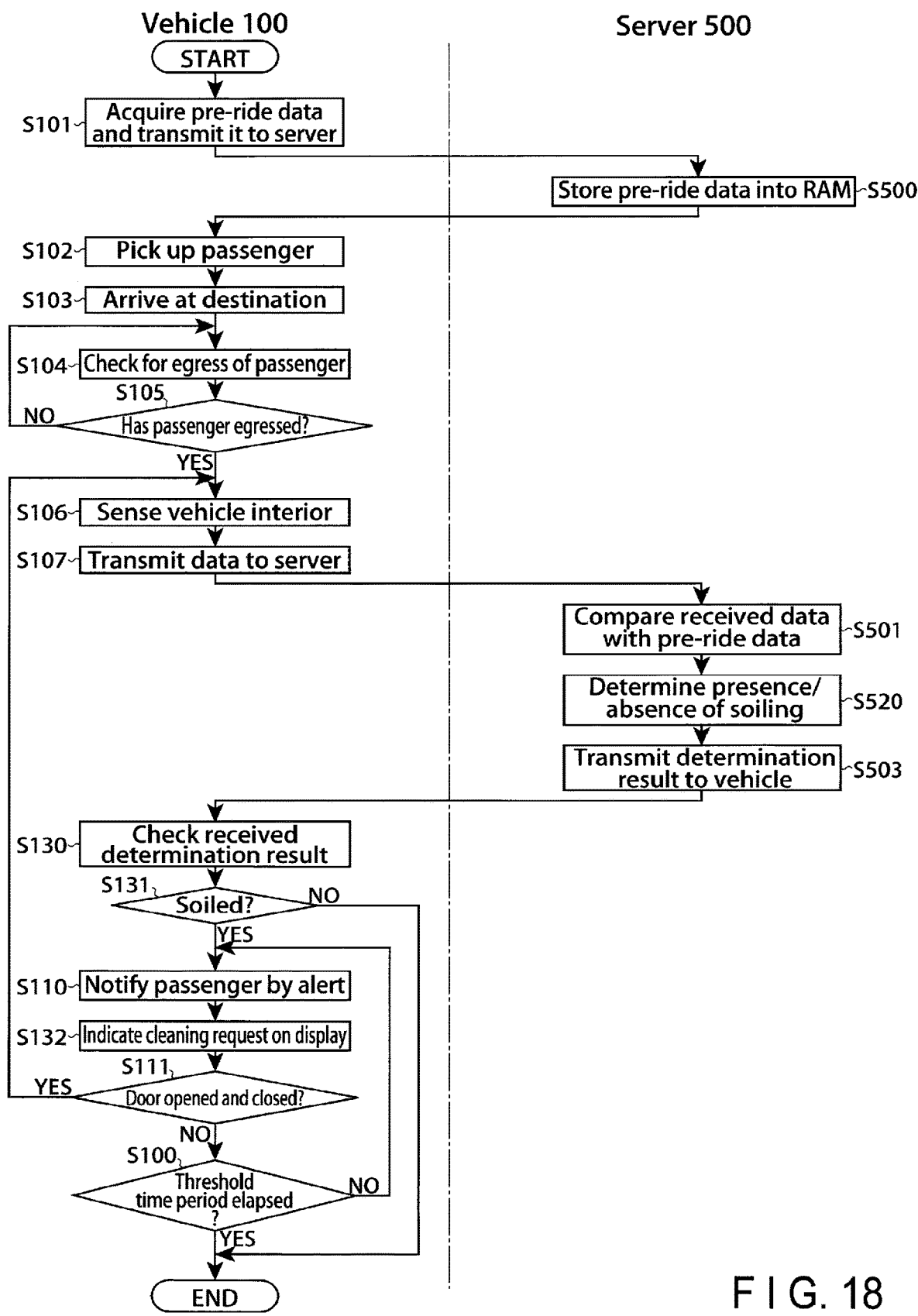
FIG. 18 is a flowchart of the process of the taxi operation system according to the third embodiment.
Figure 19:
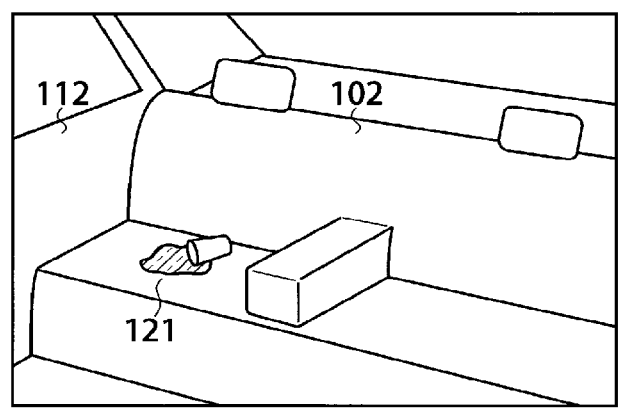
FIG. 19 is a schematic diagram of an exemplary image taken in the taxi according to the third embodiment.

With regard to the process of the taxi operation system 1 having the above structure, the following explanation focuses on the soil handling operation. FIG. 18 is a flowchart of the process of the vehicle 100 and the server 500. In FIG. 18, the processing of the vehicle 100 is based on the instruction of the processor 131 that implements the soiling program 137, while the processing of the server 500 is based on the instruction of the processor 531 that implements the soiling determination program 541. First, as indicated in the drawing, the operations at steps S101 to S107 are executed in the vehicle 100, and the operation at step S500 is executed in the server 500. These operations have been explained in the first embodiment, with reference to FIG. 5. Thereafter, the operation is executed at step S501 in the server 500. Based on the comparison result obtained at step S501, the fifth determination section 568 of the server 500 determines whether there is any soiling (step S520), and transmits the result to the vehicle 100 (step S503). FIG. 19 shows an example of the post-ride data 537, in which soiling 121 is observed. As illustrated in this drawing, a cup-like container is left on the rear seat 102 of the vehicle, from which some liquid is spilled. Thus, the fifth determination section 568 can detect the soiling 121 by comparing the pre-ride data 536 of FIG. 6A with the post-ride data 537 of FIG. 19.

The remainder of the operation is the same as in the first embodiment. That is, in the vehicle 100, the fourth determination section 167 acknowledges the determination result received from the server 500 (step S130). The fourth determination section 167 may determine whether there is soiling 121 based on the determination result received at step S503 as it is. Alternatively, the fourth determination section 167 may determine whether there is soiling 121 by modifying and further processing the received determination result. That is, in a manner similar to the first determination section 162 of the first embodiment, the percentage information of the presence/absence of soiling may be transmitted from the server 500 to the vehicle 100. By, for example, weighting this percentage, the fourth determination section 167 may determine the presence/absence of soiling.

As a result, if it is determined that there is no soiling ("no" at step S131), the process is terminated. If it is determined that there is soiling ("yes" at step S131), the first command section 164 sends a command to the loudspeaker 114 to sound an alert (step S110). The alert notifies the passenger who has already egressed the vehicle, of soiling inside the vehicle. The second command section 166 sends a command to the display 116 to display a prompt for cleaning the interior of the vehicle (step S132).

During the period of the loudspeaker 114 sounding the alert, the second determination section 163 of the vehicle 100 determines whether the passenger returns to the vehicle 100 to clean the soiled area (step S111). In particular, if the sensor 113 detects the opening/closing of the door 112, it is determined that the passenger has returned to the vehicle 100. When the passenger returns to the vehicle 100 and the door is opened and closed ("yes" at step S111), the vehicle 100 again senses the interior of the vehicle (step S106) so that the server 500 can determine the presence/absence of soiling. These operations are repeated for a threshold time period (step S100).

If the passenger cleans the soiled area, and therefore the fifth determination section 568 of the server 500 determines that no soiling remains, or if the soiling still remains but the threshold time period has elapsed ("yes" at step S100), the process is terminated.

3.3. Effects of Present Embodiment

In an autonomous driving taxi in which no driver is present, in addition to a left-behind item discussed in the first and second embodiments, soiling left in the vehicle by the passenger may also become an issue. According to the present embodiment, in the same manner as a left-behind item, checks for soiling, conventionally a driver's action, can be carried out by the sensors of the vehicle 100 and the processor of the server 500. Thus, in case the passenger soils the interior of the vehicle, a notification can be provided to draw the attention of the passenger, prompting the passenger to clean the interior of the vehicle.

According to the present embodiment, the operations for determining the presence/absence of soiling (steps S501, S520 and S503) are implemented by the server 500, as explained with reference to FIG. 18. These operations, however, may instead be implemented by the processor 131 of the vehicle 100. If this is the case, the pre-ride data 536 is stored in the RAM 133 of the vehicle 100, and the processor 131 functions as the comparison section 561 and the fifth determination section 568. Furthermore, in the same manner as the first embodiment, the notification of soiling is not limited to the alert sounding from the loudspeaker 114, but may be provided by automated voice.

The present invention may be integrated with the first embodiment. That is, the first and second embodiments are both directed to detect some change in the interior of the vehicle from the comparison result of the pre-ride data 536 with the post-ride data 537, and issue an alert from the vehicle 100 to the passenger based on the detection. Whether this change in the interior of the vehicle is a left-behind item or soiled area may be determined based on the image recognition and image comprehension performed by the processor 531 or 131. Based on the determination result, different alert messages may be used for a left-behind item and for soiling, and in case of the latter, the display 116 may show a display accordingly.

If clear water is spilled over the seat, a significant difference may not be observed between the pre-ride data 536 and the post-ride data 537. It is therefore preferable that the seats of the vehicle 100 be upholstered with a material that changes color (producing a different color) when becoming wet. In this manner, the accuracy of image recognition can be enhanced.

In addition, the technique explained in the second embodiment may be applied to the present embodiment. That is, the process to be performed when the passenger does not notice the soiling, or when the passenger did not clean thereof, may be realized by the vehicle 100 and the server 500. This example is explained with reference to FIG. 20. FIG. 20 is a flowchart of the process of the vehicle 100, the server 500, and the smartphone 400 of the passenger B, where the passenger A leaves behind a soiled area in the vehicle 100, and thereafter the passenger B is scheduled to ride this vehicle 100. In FIG. 20, the process of the vehicle 100 is based on the instructions from the processor 131, which implements the soiling program 137 and the suspension program 136. The operation of the server 500 is based on the instructions from the processor 531, which implements the soiling determination program 541 and the suspension program 540.

As a result of the process of FIG. 18 explained in the third embodiment, if the soiling remains in the vehicle after the threshold time period elapses (step S133), the fourth determination section 167 of the vehicle 100 may notify the server 500 accordingly (step S134).

Upon receipt of the notification at the server 500, the processor 531 implements the suspension program 540. Furthermore, the message transmitter 565 may produce a message of notification about the soiling and send this message to the smartphone 400 of the passenger B by referring to the user database 538 (step S521).

Upon receipt of the message from the server 500, the smartphone 400 displays a screen as illustrated in FIG. 21. FIG. 21 is a schematic diagram showing an example of the displayed screen of the smartphone 400. As illustrated in this drawing, an image of the soiling 121 is attached, together with the message notifying of the soiling 121. In this example, an image of a cup and spilled liquid, which constitute the soiling 121, is enlarged from the image of FIG. 19. The smartphone 400 may further display a message that prompts the passenger B to select a preference regarding vehicle dispatch. In other words, the smartphone 400 prompts the passenger B to select a soiled vehicle as scheduled to be dispatched or another unsoiled vehicle to be dispatched. The smartphone 400 receives a selection regarding the vehicle dispatch from the passenger B (step S401). This selection information is transmitted from the smartphone 400 to the server 500.

If a preference of another unsoiled vehicle 100 is received from the passenger B ("yes" at step S522), the server 500 and the vehicle 100 execute the operations at steps S506, S115, S116, and S507 explained in the second embodiment with reference to FIG. 12, as a result of which the service of the soiled vehicle 100 is suspended, and the nearby station 200 is searched for. Then, the suspension processing section 567 sets the station 200 found at step S507 as a destination (step S523).

On the other hand, a preference of a soiled vehicle 100 to be dispatched is received from the passenger B ("no" at step S522), the suspension processing section 567 or fifth determination section 568 of the server 500 sets the pick-up location of the passenger B as a destination (step S524).

After step S523 or S524, the suspension processing section 567 or fifth determination section 568 transmits a command to the vehicle 100 to head for the destination, together with the positional information of the destination (step S525). Upon receiving the move command, the vehicle 100 heads for the station 200 or the pick-up location of the passenger B in accordance with the positional information of the destination (step S135).

If it is determined that the vehicle is heavily soiled, the server 500 may skip the operations at steps S521, S401 and S522 and proceed to the operation at step S506 so that an unsoiled vehicle 100 can be dispatched.

When the vehicle 100 is returned to the station 200, the vehicle 100 will be cleaned by the staff of the station 200. On the other hand, if the passenger B takes the soiled vehicle 100, the vehicle 100 may be cleaned by the passenger B. If this is the case, the server 500 may give a high evaluation to the passenger B in the user database 538. Such an example will be described later in the fifth embodiment.

4. Fourth Embodiment

An information processing device, information processing method, and information processing program according to the fourth embodiment are explained. According to the present embodiment, an odor in the interior of the vehicle is detected in the first to third embodiments, and the vehicle dispatching method is altered in accordance with the level of odor. The following explanation will focus only on the points that differ from the first to third embodiments.

4.1. Structure

Figure 22:
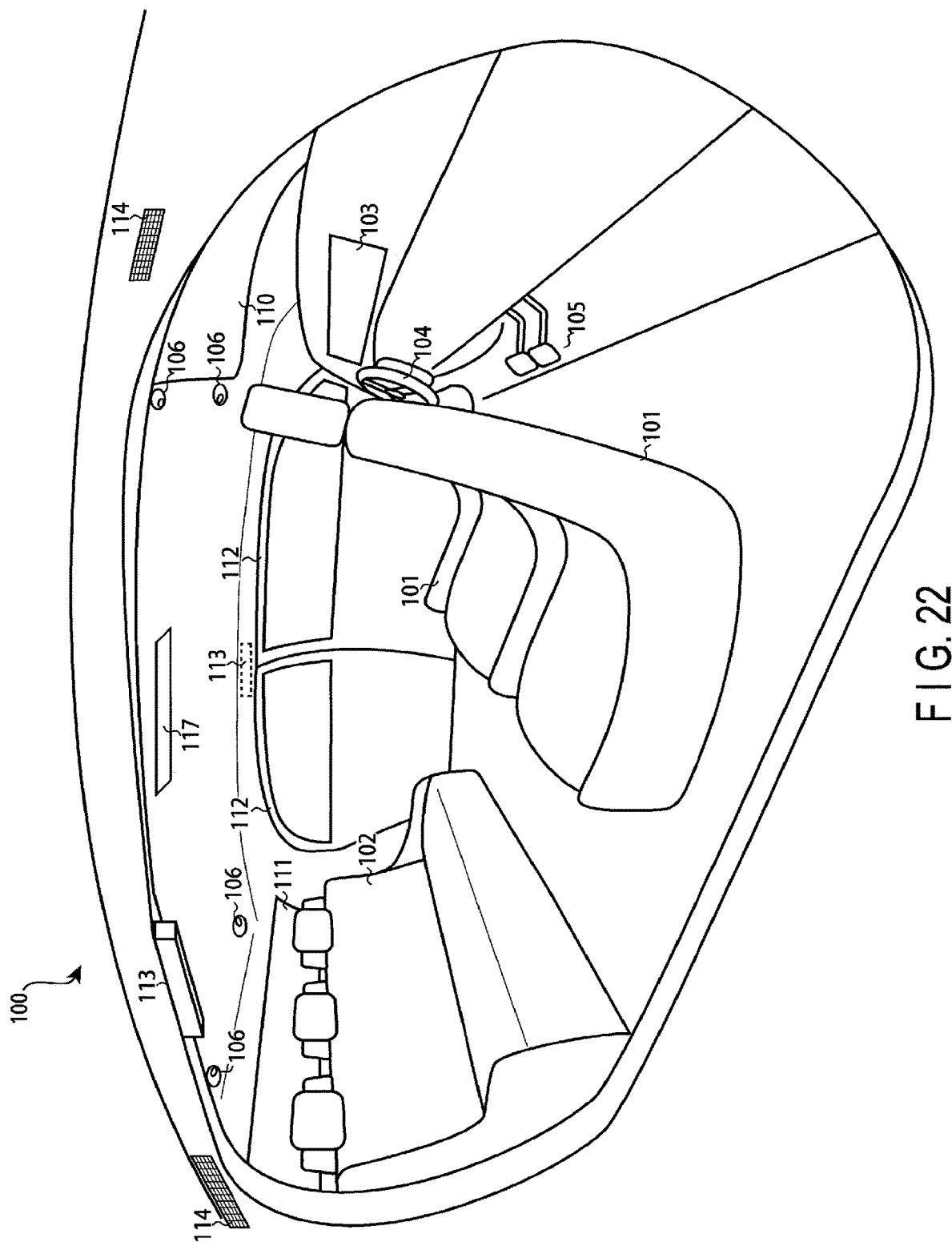
FIG. 22 is a conceptual diagram of the interior of the taxi according to the fourth embodiment.

FIG. 22 is a schematic diagram of the vehicle 100 according to the present embodiment, which corresponds to FIG. 2 discussed in the first embodiment. As illustrated in this drawing, the vehicle 100 having the structure of FIG. 2 further includes an odor sensor 117. The purpose of the odor sensor 117 is to detect the odor of the interior of the vehicle 100. In the example in FIG. 22, a single odor sensor 117 is arranged at one position on the ceiling of the vehicle. However, a plurality of odor sensors 117 may be arranged at different positions inside the vehicle. If this is the case, the measurement value obtained by the odor sensor 117 that indicates the highest sensibility may be adopted, or an average of the measurement values obtained by different odor sensors 117 may be adopted.

Figure 23A:
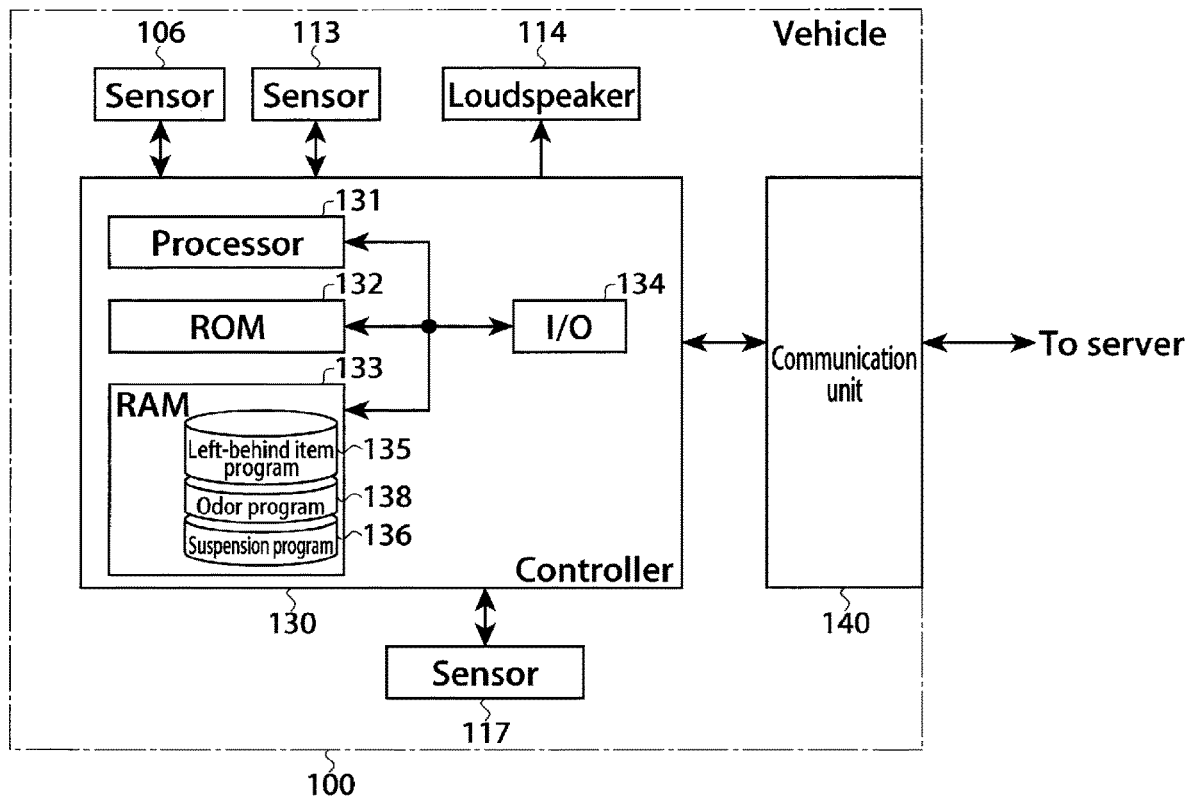
FIG. 23A is a block diagram of a taxi according to the fourth embodiment.
Figure 23B:
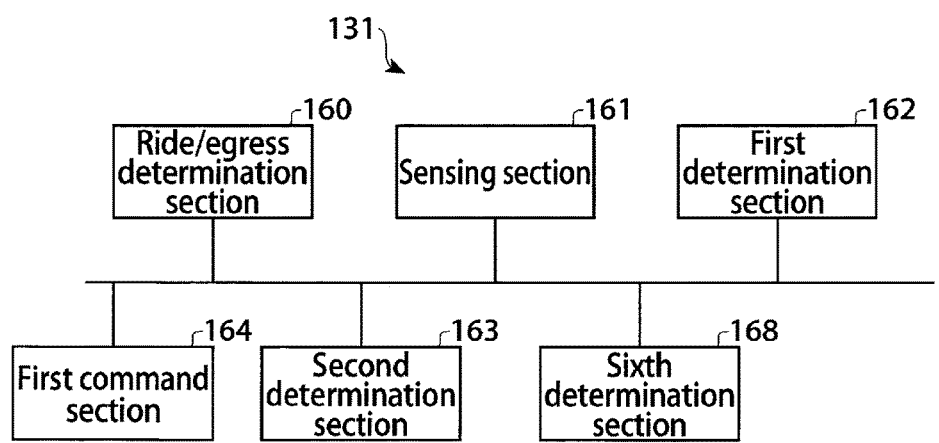
FIG. 23B is a functional block diagram of the processor of the taxi according to the fourth embodiment.

FIG. 23A is a block diagram showing an exemplary hardware structure of the vehicle 100, and FIG. 23B is a functional block diagram of the processor 131. They correspond to FIGS. 3A and 3B, respectively, of the first embodiment.

As illustrated in FIG. 23A, the vehicle 100 is provided with the odor sensor 117 in the structure of FIG. 3A. The RAM 133 includes an odor program 138 in addition to the left-behind item program 135 and the suspension program 136. By implementing this odor program 138, the processor 131 further functions as a sixth determination unit 168. The sensing section 161 sends a command to the sensor 117 to execute in-vehicle sensing. In particular, when the ride/egress determination section 160 determines that a passenger has egressed the vehicle, the sensing section 161 issues a command to the sensor 117 to measure the odor, and receives the odor data indicating the level of odor. The odor data may be stored in the RAM 133, and transmitted to the server 500 via the communication unit 140. The sixth determination unit 168 performs necessary calculations for the odor data. Alternatively, the sixth determination unit 168 may determine whether information indicating a level of odor higher than or equal to a predetermined level is received from the server 500. In the present example, the left-behind item program 135, the suspension program 136, and the odor program 138 may be integrated into a single program.

Figure 24A:
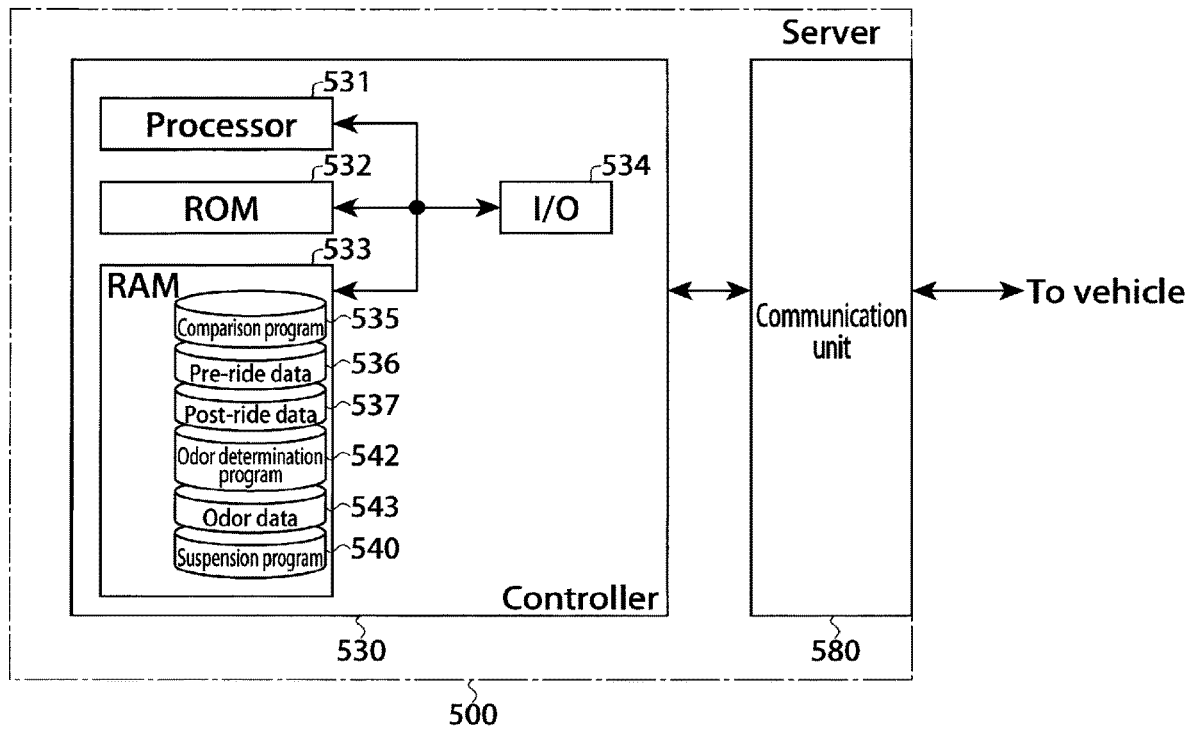
FIG. 24A is a block diagram of a server according to the fourth embodiment.
Figure 24B:
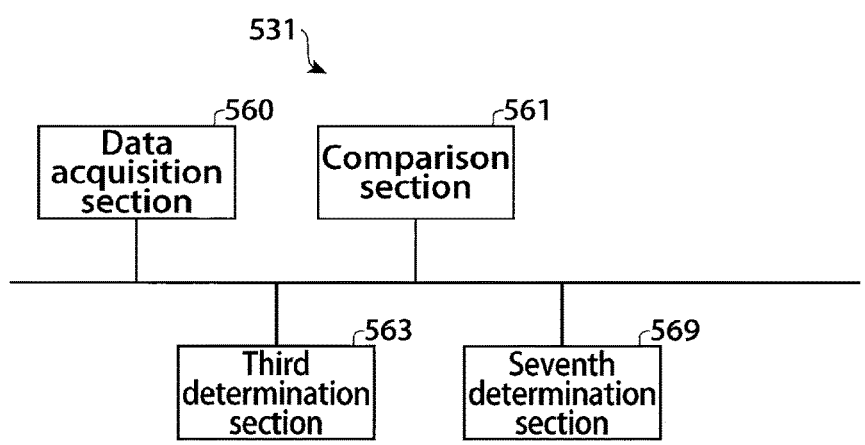
FIG. 24B is a functional block diagram of the processor of the server according to the fourth embodiment.

The structure of the server 500 according to the present embodiment is explained with reference to FIGS. 24A and 24B. FIG. 24A is a block diagram showing an exemplary hardware structure of the server 500, and FIG. 24B is a functional block diagram of the processor 531. They correspond to FIGS. 4A and 4B, respectively of the first embodiment.

As illustrated in FIG. 24A, the RAM 533 of the server 500 further includes a suspension program 540, an odor determination program 542 and odor data 543 in the structure of FIG. 4A. By implementing the odor determination program 542, the processor 531 further functions as a seventh determination section 569, as illustrated in FIG. 24B. In the present example, the comparison program 535, the suspension program 540, and the odor determination program 542 may be integrated into a single program. The odor data 543 is received from the vehicle 100. The seventh determination section 569 determines, based on the odor data 543, the level of odor inside the vehicle 100. The seventh determination section 569 may determine the presence/absence of an odor so that whether the level of the odor is higher than or equal to a predetermined level may be determined by the sixth determination unit 168 of the vehicle 100. Alternatively, the seventh determination section 569 may determine whether the level of the odor is higher than or equal to a predetermined level.

4.2. Operations

Figure 25:
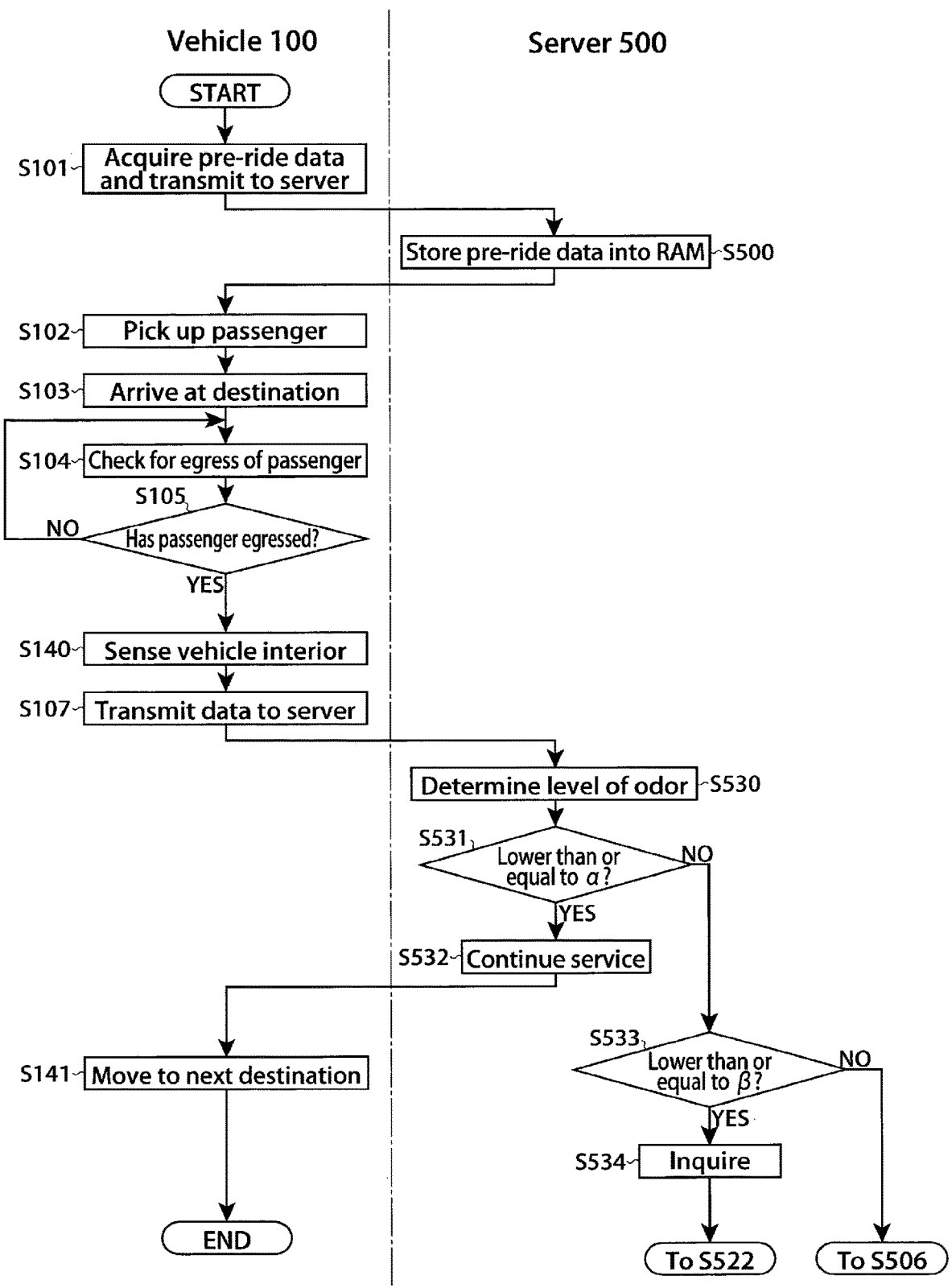
FIG. 25 is a flowchart of the process of the taxi operation system according to the fourth embodiment.

Next, the process of the taxi operation system 1 having the above structure is explained. FIG. 25 is a flowchart of the process of the vehicle 100 and the server 500. In FIG. 25, the process of the vehicle 100 is based on the instruction of the processor 131 that implements the odor program 138, while the process of the server 500 is based on the instruction of the processor 531 that implements the odor determination program 542.

As indicated in this drawing, first, the operations at steps S101 to S105 are executed in the vehicle 100, and the operation at step S500 is executed in the server 500. These operations have been explained in the first embodiment, with reference to FIG. 5. When it is determined that the passenger has egressed the vehicle, the sensing section 161 of the processor 131 issues a command to the sensor 117 to perform in-vehicle sensing (step S140). That is, the sensor 117 is instructed to measure the in-vehicle odor. The odor data 543 acquired at step S140 is transmitted to the server 500, and is stored in the RAM 533 (step S107). The sensor 117 may constantly measure the odor. When the in-vehicle odor exceeds a predetermined value, an alert may be issued to the station 200 via the server 500. Alternatively, when it is determined that the passenger has egressed the vehicle ("yes" at step S105), the measurement value at this point in time may be transmitted to the server 500 (step S107).

Next, the seventh determination section 569 of the server 500 determines the level of in-vehicle odor, based on the odor data 543 transmitted at step S107 (step S530). The processor 531 uses odor thresholds $\alpha$ and $\beta$ stored in the ROM 532 or RAM 533, where $\alpha<\beta$. First, when the level of in-vehicle odor is lower than or equal to $\alpha$ ("yes" at step S531), the seventh determination section 569 determines that the odor would not seriously affect the service, and issues a command to the vehicle 100 to continue the service (step S532). In response to this command, the vehicle 100 heads for the next destination (next passenger pick-up location) (step S141).

When the level of in-vehicle odor exceeds $\alpha$ and is lower than or equal to $\beta$, the seventh determination section 569 sends a message to the smartphone 300 of the passenger A, who is scheduled for the next ride, to ask whether or not he/she will accept the dispatch of this vehicle 100 (step S534). The remainder of the operation is the same as step S522 and subsequent steps in FIG. 20 of the third embodiment, except that the destination set at step S524 is the pick-up location of the passenger A instead of that for passenger B of the next ride. That is, unless the passenger A requests another vehicle, the vehicle 100 carries the passenger A. On the other hand, if the passenger A requests another vehicle, the odorous vehicle 100 suspends the service to be cleaned at the nearby station 200.

If the level of in-vehicle odor exceeds $\beta$, the seventh determination section 569 executes the operations at step S506 and subsequent steps in FIG. 20 of the third embodiment. That is, the vehicle 100 determines that the in-vehicle odor is so intense that it hampers the service. The vehicle 100 therefore suspends the service in order to be cleaned at the nearby station 200.

4.3. Effects of Present Embodiment

According to the present embodiment, with the odor sensor 117 arranged inside the vehicle 100, not only in-vehicle soiling but also odor can be handled.

Without a driver in the autonomous driving vehicle, the eventuality of a passenger engaging in in-vehicle smoking despite being in a non-smoking vehicle may need to be considered. In case this happens, the vehicle 100 and the server 500 according to the present embodiment measures the level of in-vehicle odor, and may provide a substitute vehicle if the odor seems likely to affect the service. In addition, by asking the user's preference, the vehicle 100 may offer a service even with the presence of some odor.

According to the present embodiment, the process for determining the level of odor (steps S530 to 534) is implemented by the server 500, as explained with reference to FIG. 25. The process, however, may be implemented by the processor 131 of the vehicle 100 instead. If this is the case, the data related to the thresholds α and β is stored in the RAM 133 of the vehicle 100.

The present embodiment may be implemented in combination with the third embodiment. In particular, instead of separately handling the odor and soiling, these two may be dealt with as one so that the presence/absence of soiling may be determined based on the image data and odor data. For example, when it is difficult to determine a left-behind item or soiling from the image data only, the odor data may be referred to. If an odor more intense or equal to a predetermined level is found, the presence of soiling may be determined. Alternatively, determination of a left-behind item or soiling may first be made based on the odor data, and if the determination of a left-behind item is made, a further determination of a left-behind item or soiling may be made using the image recognition or image comprehension of the image data.

5. Fifth Embodiment

An information processing device, information processing method, and information processing program according to the fifth embodiment are explained. The present embodiment is to provide each passenger with reward points in accordance with the passenger's handling of left-behind items, soiling, and odors, and to calculate the fare by referring to these points in the above first to fourth embodiments. The following explanation will focus only on the points that differ from the first to fourth embodiments.

5.1. Structure

The structure of the vehicle 100 according to the present embodiment is first explained. FIG. 26A is a block diagram showing an exemplary hardware structure of the vehicle 100, and FIG. 26B is a functional block diagram of the processor 131. They correspond to FIGS. 3A and 3B, respectively, of the first embodiment.

As illustrated in FIG. 26A, the vehicle 100 has a structure obtained by combining FIGS. 3A, 8A, 16A, and 23A explained in the first to fourth embodiments. The processor 131, which implements the programs 135 to 138, functions as the ride/egress determination section 160, the sensing section 161, the first determination section 162, the second determination section 163, the first command section 164, the suspension processing section 165, the second command section 166, the fourth determination section 167, and the sixth determination unit 168, as illustrated in FIG. 26B.

Figure 27A:
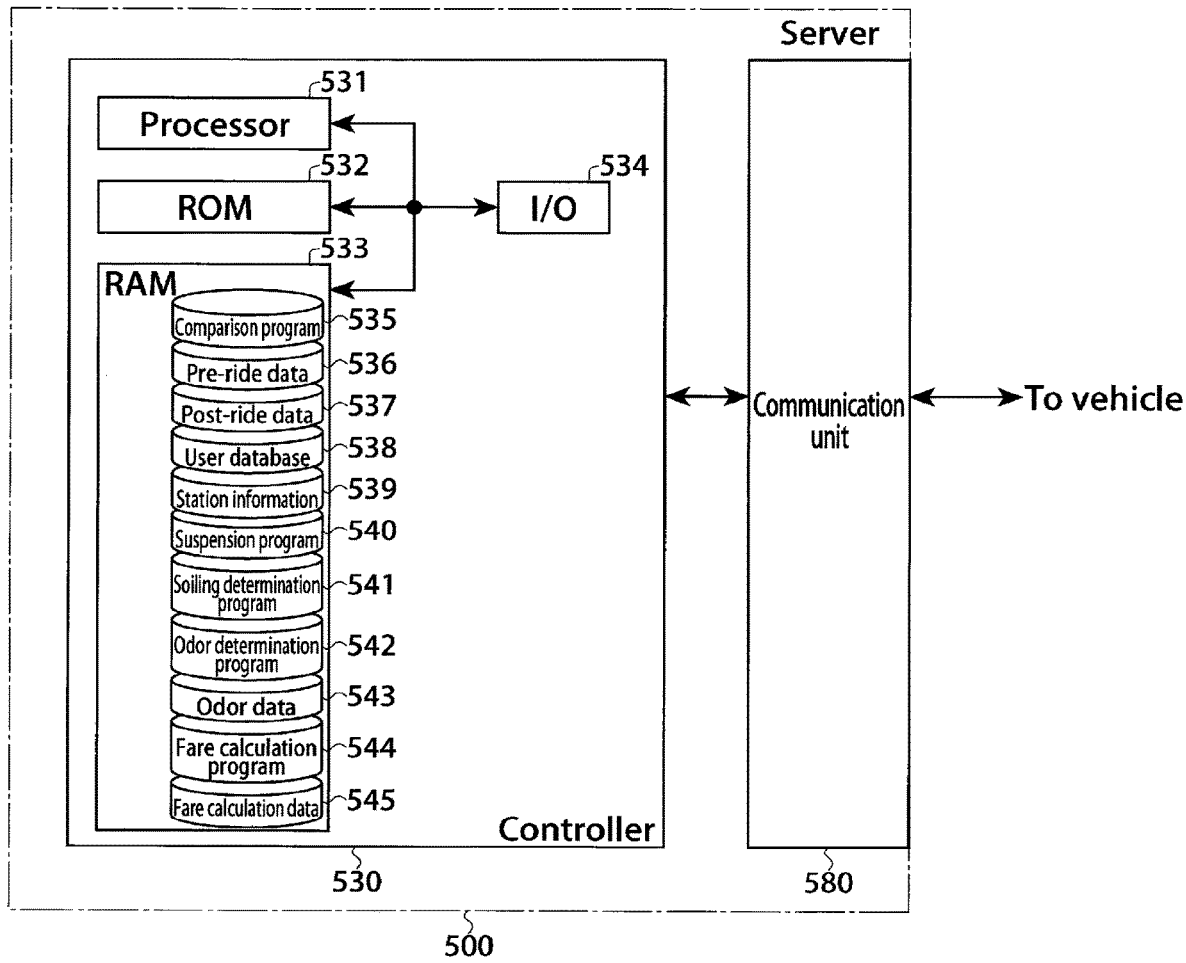
FIG. 27A is a block diagram of a server according to the fifth embodiment.
Figure 27B:
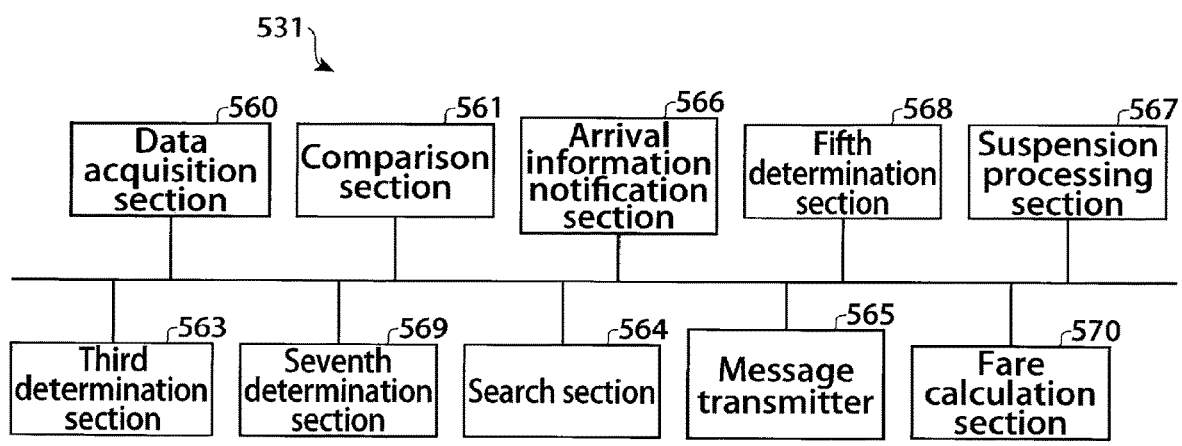
FIG. 27B is a functional block diagram of the processor of the server according to the fifth embodiment.

Next, the structure of the server 500 is explained. FIG. 27A is a block diagram showing an exemplary hardware structure of the server 500, and FIG. 27B is a functional block diagram of the processor 531. They correspond to FIGS. 4A and 4B, respectively, of the first embodiment.

As illustrated in FIG. 27A, the server 500 has a structure obtained by combining FIGS. 4A, 9A, 17A, and 24A explained in the first to fourth embodiments. The RAM 533 further includes a fare calculation program 544 and fare calculation data 545. The processor 531, which implements the programs 535 and 540 to 542, functions as the data acquisition section 560, the comparison section 561, the third determination section 563, the search section 564, the message transmitter 565, the arrival information notification section 566, the suspension processing section 567, the fifth determination section 568, and the seventh determination section 569, and further implements as a fare calculation section 570 by implementing the fare calculation program 544, as illustrated in FIG. 27B.

FIG. 28A is a conceptual diagram of the user database 538 according to the present embodiment. As indicated in this drawing, in addition to the information in FIG. 9C explained in the second embodiment, the user database 538 includes information of reward points given to each passenger. The server 500 determines the behavior of the passenger during the ride and automatically provides him/her with points. In the example of FIG. 28A, the passenger A is given 1000 points, the passenger B is given 500 points, and passenger C is given 2000 points.

These points are factored into the fare so that a larger discount is applied to the fare with higher points, while a smaller discount is applied to the fare with lower points. The relationship between points and applied fares is stored in the RAM 533 as the fare calculation data 545. FIG. 28B is a conceptual diagram showing an example of the fare calculation data 545. As indicated in this drawing, 1000 to 1499 points are standard points, to which regular fares are applied. In this example, it is assumed that at the first use of the autonomous driving taxi service, 1000 points are given as bonus points. The points higher than or equal to 1000 are therefore standard points. Users with points higher than 1499 are rated as "excellent", and receive 5% discounts on the fare. On the other hand, passengers with points less than 1000 receive an additional charge in accordance with the points. Users with points less than or equal to 0 are determined as "ill-mannered", and may be refused for the taxi service. FIG. 28B provides a mere example, and taxi business operators can suitably determine the settings.

Points are given in accordance with the ride behavior exhibited each time a passenger takes an autonomous driving taxi. The fare calculation data 545 includes the relationship between the ride behaviors and points. FIG. 28C is a conceptual diagram of an example. As illustrated in this drawing, behaviors may be ranked in the descending order as "platinum", "gold", "silver" and "bronze". For a behavior corresponding to "platinum", five points are added; three points are added for "gold", and 1 point is added for silver. The determination of "ill-mannered" corresponds to "bronze", for which 100 points may be deducted. The criterion for "platinum" may be that of taking a vehicle 100 in which a previous passenger has left an item behind and having the left-behind item delivered before his/her own destination, as explained in the second embodiment, or cleaning the soiled area left by the previous passenger, as explained in the third embodiment. The criterion for "gold" may be that of taking a vehicle 100 in which a previous passenger has left an item behind and having the left-behind item delivered after his/her own destination, as explained in the second embodiment, selecting a vehicle 100 soiled by the previous passenger (but not cleaning the soiled area) as explained in the third embodiment, or selecting an odorous vehicle 100, as explained in the fourth embodiment. Soiling the vehicle 100 or leaving an odor corresponds to "bronze". FIG. 28C provides a mere example, and the settings can be suitably determined.

5.2. Operations

With the process of the taxi operation system 1 according to the present embodiment, the following explanation focuses on the fare calculation method. FIG. 29 is a flowchart of the process of the server 500. The process of FIG. 29 is mainly executed by the processor 531 that implements the fare calculation program 544.

As illustrated in this drawing, the server 500 first receives a request for a dispatched vehicle from a passenger's terminal (step S540). Here, the server 500 also receives the passenger pick-up location, destination, and requested pick-up time. Then, the processor 531 implements the fare calculation program 544. In response, the fare calculation section 570 reads from the RAM 533 a standard fare chart, which is part of the fare calculation data 545 (step S541). This fare chart includes, for example, the relationship between the distances/time lengths and the fares, and conditions for additional charges. The fare calculation section 570 refers to the user database 538 of the RAM 533 to check the reward points that the passenger possesses (step S542). If the user information is not entered in the user database 538, this passenger needs to be newly entered in the user database 538, to whom 1000 points are given.

Furthermore, the fare calculation section 570 calculates the fare based on the fare chart and the user database 538 (step S543). Then, the server 500 transmits to the terminal (smartphone 300 or 400) of the passenger the availability of a vehicle and, if available, the fare information (step S544). As described earlier, the server 500 refuses the vehicle dispatch if the passenger who has requested the vehicle dispatch has 0 points or below. If no vehicle 100 is available at the pick-up time requested by the passenger, the server 500 notifies the fact that the vehicle is unavailable. If this is the case, the server 500 may list available times for vehicle dispatch on the passenger's terminal.

Thereafter, passenger carrying services are offered to the passenger (step S545). After carrying the passenger to the destination, the fare calculation section 570 determines the passenger's ride behavior (step S546). Whether the passenger has been carried together with the previous passenger's left-behind item, and whether a priority is placed on the delivery of the left-behind item may be determined by the third determination section 563, as described in the second embodiment. Whether a soiled area has been left in the vehicle, or whether the soiled area has been cleaned as explained in the third embodiment, may be determined by the fifth determination section 568. Furthermore, whether the passenger has taken an odorous vehicle 100 as explained in the fourth embodiment may be determined by the seventh determination section 569.

The fare calculation section 570 determines the passenger's ride behavior, based on the information from the above third determination section 563, fifth determination section 568, and seventh determination section 569, and notifies the passenger's terminal of the determination (step S547). The fare calculation section 570 recalculates the passenger's reward points based on the points added or deducted in accordance with the behavior of the latest ride (step S548), and enters the points into the user database 538 (step S549).

5.3. Effects of Present Embodiment

According to the present embodiment, a certain status can be given to a passenger so that his or her ride behavior can be improved. Moreover, good users can be attracted in this way.

In an autonomous driving taxi without a driver, there is a risk that the passenger may become ill-mannered. If the number of ill-mannered passengers increases, frequently soiling the interior of the vehicle, for example, the taxi business operator needs to bear a larger burden (including the cleaning by station staff).

According to the present embodiment, the passengers are evaluated in accordance with points corresponding to their ride behaviors. As well-mannered passengers are offered a discount service, they are encouraged to frequently use a taxi. On the other hand, by applying an additional charge to ill-mannered passengers, burdens on the taxi business operator can be reduced, and extremely ill-mannered passengers may be refused for the ride.

6. Sixth Embodiment

An information processing device, information processing method, and information processing program according to the sixth embodiment are explained. The present embodiment relates to a method for changing a person to be billed for fare to the passenger when the passenger is not a person who has called a vehicle 100 in the first to fifth embodiments. The following explanation will focus only on the points that differ from the first to fifth embodiments.

6.1. Structure

Figure 30A:
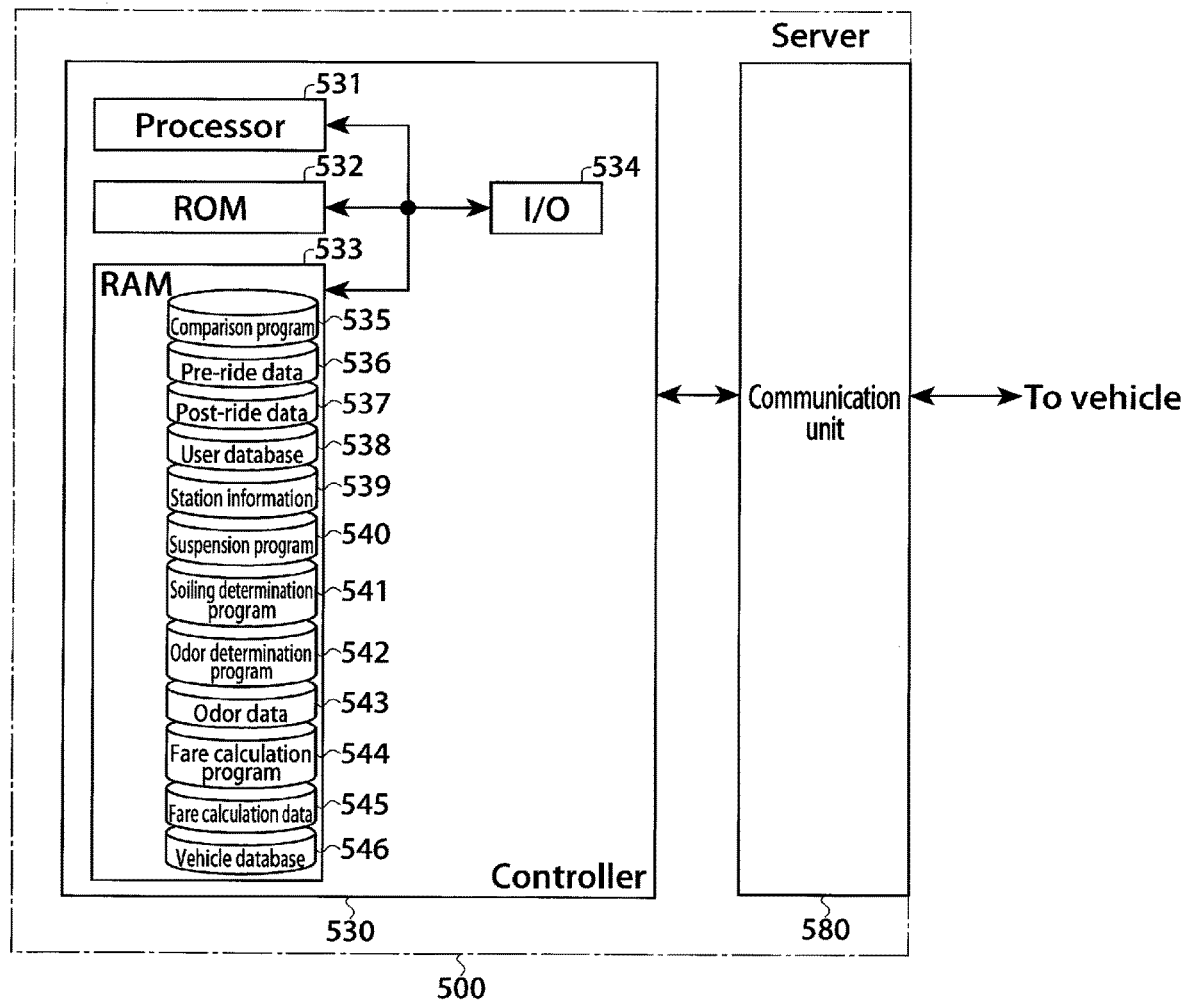
FIG. 30A is a block diagram of a server according to the sixth embodiment.
Figure 30B:
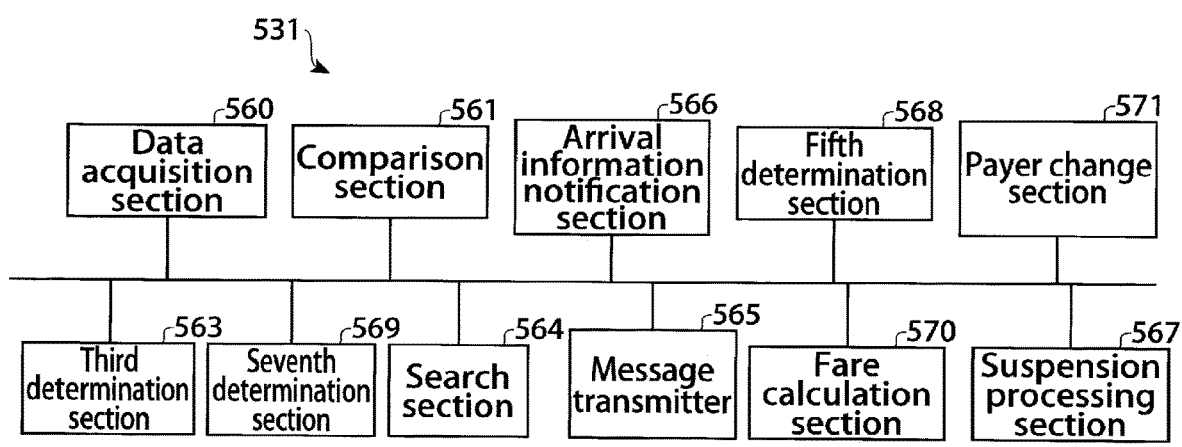
FIG. 30B is a functional block diagram of the processor of the server according to the sixth embodiment.

The structure of the server 500 according to the present embodiment is first explained. FIG. 30A is a block diagram showing an exemplary hardware structure of the server 500, and FIG. 30B is a functional block diagram of the processor 531.

As illustrated in FIG. 30A, the RAM 533 of the server 500 further includes a vehicle database 546 in the structure of FIG. 27A explained in the fifth embodiment. By implementing the fare calculation program 544, the processor 531 further functions as a payer change section 571, as illustrated in FIG. 30B.

FIG. 30C is a conceptual diagram of the vehicle database 546 according to the present embodiment. As illustrated in this drawing, the vehicle database 546 holds the dispatch schedule of in-service vehicles of the taxi business operator. In the example of FIG. 30C, an in-service vehicle XX is dispatched to a user A between 9:00 and 11:00, and an in-service vehicle ZZ is dispatched to a user C between 10:30 and 12:30. FIG. 30C shows a dispatch schedule of a day, but a monthly or annual schedule may be stored. When a new call for a vehicle is received and a dispatch is completed, the vehicle database 546 is updated. The fare incurred in each in-service vehicle is charged to a user entered in the user database 538. In the example of FIG. 30C, the fare incurred by the ride of the in-service vehicle XX at 9:00 will be charged to the user A, and the fare incurred by the ride of the in-service vehicle ZZ at 10:30 will be charged to the user C. The vehicle database 546 is stored, for example, together with the user database 538, in the server 700 and read from the server 700 to the server 500.

6.2. Operations

With the process of the taxi operation system 1 according to the present embodiment, the following explanation focuses on the fare payer changing method. In the following example, the user A requests dispatch of a vehicle, but another user, user B, actually takes the vehicle and pays the fare. FIG. 31 is a flowchart of the process of the smartphone 300 of the user A, the server 500, and the vehicle 100, in which the states of the user database 538 and the vehicle database 546 are also indicated. The process of the server 500 in FIG. 31 is mainly executed by the processor 531 that implements the fare calculation program 544.

As illustrated in this drawing, a request for a vehicle dispatch is sent from the smartphone 300 of the user A to the server 500 (step S310). Step S310 corresponds to step S540 according to the fifth embodiment. The fare calculation section 570 of the server 500 performs vehicle search (step S560) and fare calculation (step S561). Steps S560 and S561 correspond to steps S541 to 543 according to the fifth embodiment. The fare calculation section 570 obtains dispatch schedule information by referring to the vehicle database 546 at step S560. It is determined whether any vehicle 100 is available at the time and date requested by the user A. At step S561, the fare calculation section 570 obtains fare information applied to the user A by referring to the user database 538. In particular, the fare calculation section 570 reads the points of the user A explained in the fifth embodiment with reference to FIG. 28A, and selects an applicable fare explained with reference to FIG. 28B. All the information is transmitted to the vehicle 100.

The vehicle availability and fare received from the server 500 are displayed on the smartphone 300 of the user A (step S311). The vehicle availability may include:

Vehicle available as requested by user A

Vehicle unavailable at time requested by user A but available at other times

Request denied

When a vehicle reservation request is sent from the smartphone 300, the fare calculation section 570, for example, of the server 500 assigns a vehicle 100 to the user A (step S562). That is, as illustrated in FIG. 30C, the dispatch schedule of the vehicle database 546 is updated to relate the in-service vehicle XX to the user A between 9:00 and 11:00 (step S563).

Thereafter, in response to a command from the server 500, the vehicle 100 (in-service vehicle XX) sets the pick-up location and destination designated by the user A (step S150), and heads for pick-up (step S151). At the pick-up location, the vehicle 100 does not pick up the user A but instead picks up the user B (step S152), and heads for the destination (step S153). The in-vehicle display 116 of the vehicle 100 accepts a payer change input by the user B (step S154). That is, the display 116 receives an input to change the payer of the fare from the user A to the user B, and the vehicle 100 transmits the received information to the server 500.

The payer change section 571 of the server 500 changes the user assignment for the vehicle 100 (in-service vehicle XX) (step S564). In particular, in the vehicle database 546 of FIG. 30C, the assignment of the in-service vehicle XX is changed from the user A to the user B (step S565). When the vehicle 100 arrives at the destination (step S155), the process is terminated. A bill for the fare may be sent to the user B at a later date, based on the information of the user database 538, or the fare may be deducted from the credit card or bank account of the user B stored in the user database 538.

Figure 32A:
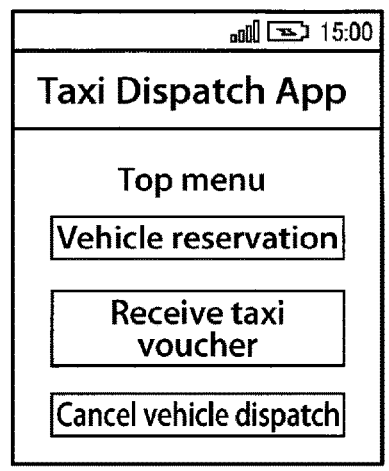
FIG. 32A, FIG. 32B, FIG. 32C, FIG. 32D, FIG. 32E and FIG. 32F are schematic diagrams of an exemplary display screen of the user's terminal according to the sixth embodiment.
Figure 32B:
Figure 32C:
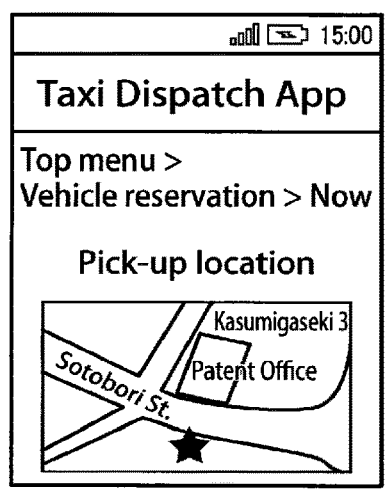
Figure 32D:
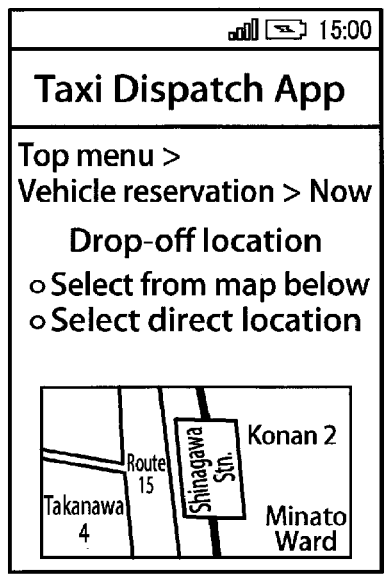
Figure 32E:
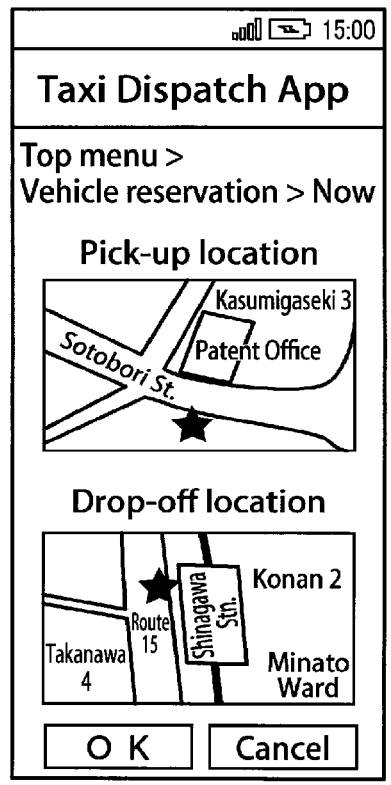

In relation to the above operation, exemplary screens displayed on the smartphone 300 and display 116 are explained. First, exemplary screens for requesting a vehicle at step S310 are shown in FIGS. 32A to 32E. On the top menu of the smartphone 300 shown in FIG. 32A, not only a vehicle reservation but also issuance of a taxi voucher and cancellation of the vehicle reservation are entered. When a vehicle reservation is selected, the display changes to a screen as illustrated in FIG. 32B, which prompts selection of "now" or entry of a specific date and time. Next, the display changes to a screen for selecting a pick-up location as illustrated in FIG. 32C. In the example of FIG. 32C, a pick-up location can be selected by touching a spot on the map (e.g., the star in FIG. 32C). Thereafter, the display changes to a screen for entry of a drop-off location as illustrated in FIG. 32D. In the example of FIG. 32D, the location may be selected from the map, or may be designated directly by an address or name of a facility. Then, the display is switched to a confirmation screen, as illustrated in FIG. 32E. When the "OK" button is selected in FIG. 32E, a vehicle request is completed.

Figure 32F:

FIG. 32F is a screen corresponding to steps S311 and S312. As illustrated in this drawing, the arrival time at the designated pick-up location and fare are displayed. When the "confirm" button is selected, the vehicle is reserved.

Figure 33A:
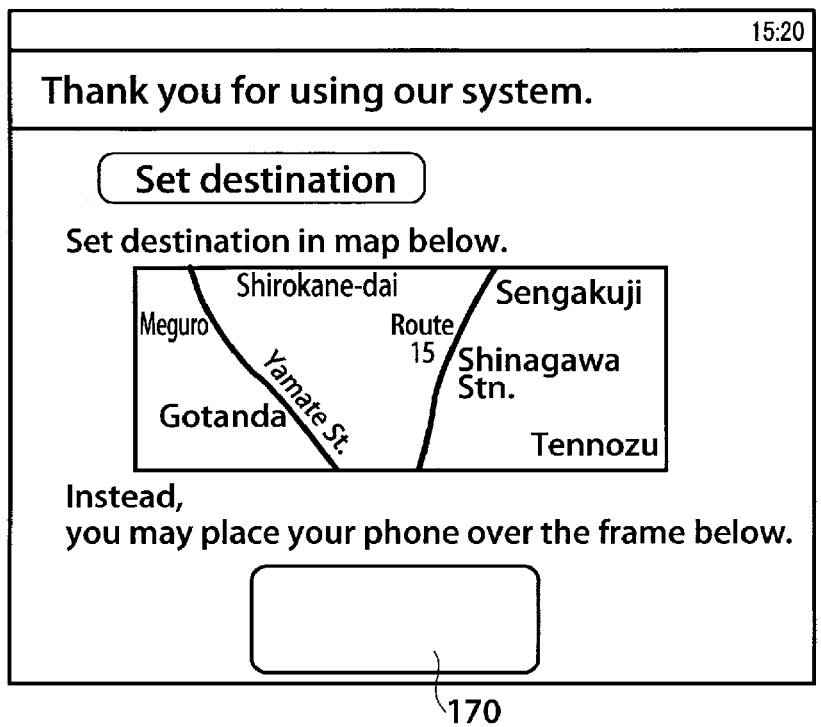
Figure 33B:
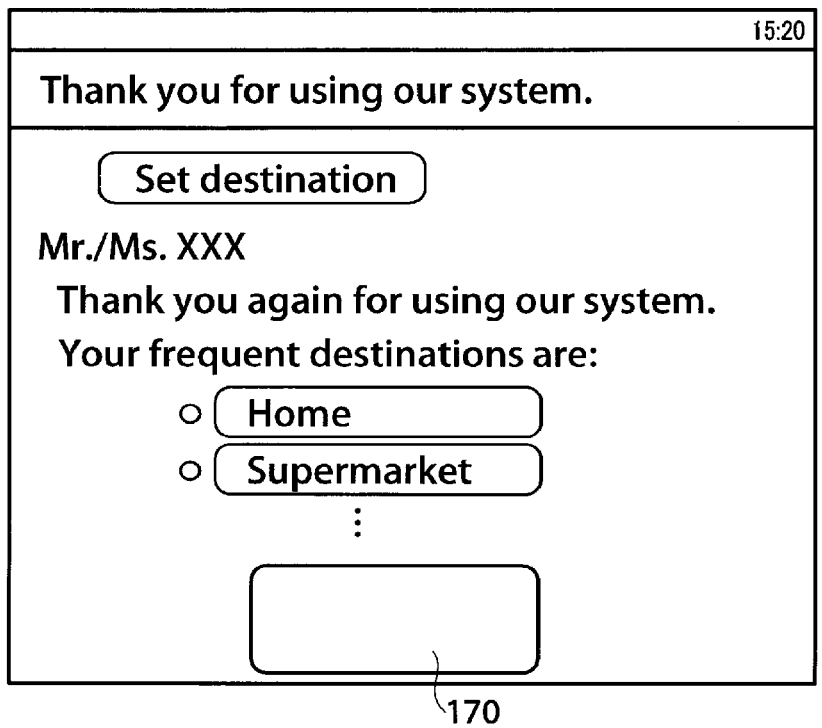

Next, the screen of the display 116 on the vehicle 100 carrying the user B is explained. FIG. 33A is the screen of the display 116, for example, displayed at step S152 or S153. When the user A makes a reservation, the destination is designated. This destination, however, may be changed by the user B in the vehicle 100. FIG. 33A shows an example of such a situation. In response to a command from the processor 131, the display 116 prompts the user B to set the destination. In the example of FIG. 33A, the display 116 is provided with a near field communication (NFC) reader 170. Thus, the user B brings the NFC-function equipped smartphone 400 close to the NFC reader 170 so that the information of the user B stored in the smartphone 400 can be transmitted to the RAM 133 of the vehicle 100. The display for such a case is illustrated in FIG. 33B. The display 116 lists candidate destinations for the user B, based on the previous records, as illustrated in FIG. 33B. The processor 131 acknowledges that the user B is included in the passengers.

Furthermore, when the display 116 receives selection of a payer change at step S154, the screen of FIG. 33C is displayed in response to the command from the processor 131. As illustrated in this drawing, the display 116 lists the user A, who has requested the vehicle dispatch, and the user B, who is actually taking the vehicle, for the payment. When the display 116 receives the selection of either the user A or user B, the processor 131 transmits this information to the server 500.

6.3. Effects of Present Embodiment

With the present embodiment, the payer of the fare is changeable, thus improving the degree of freedom in use of a taxi.

When arranging a taxi, a person may call one for him/herself, or for somebody else. In an autonomous driving taxi where a driver is not present, it is preferable from the aspect of reliable collection of the fare that the payment of the fare be made by means of deduction from a credit card or bank account entered in the user database 538, rather than by in-vehicle settlement using electronic money or the like.

At this point, unless the vehicle 100 and the server 500 acknowledge that the person who has arranged the taxi is different from the passenger, the server 500 cannot charge the fare to anyone other than the person who has arranged the taxi because the server 500 possesses, at the time of the vehicle arrangement, information of only the person who has arranged the taxi.

According to the present embodiment, the payer of the fare can be changed inside the vehicle 100. In particular, the passenger identification information can be transmitted, for example from the smartphone 400, to the vehicle 100 so that a payer can be selected. This selection information is then transmitted from the vehicle 100 to the server 500. In this manner, the server 500 updates the information of the vehicle database 546, and charges the fare based on the updated information.

According to the present embodiment, an example in which the user B who is to pay the fare is entered in the user database 538 before the ride has been discussed. However, if the user B is not entered in the user database 538, the name, address and credit card information, etc. can be input on the display 116 inside the vehicle so that the entry can be made into the user database 538. Alternatively, the information of the user B may not have to be entered into the user database 538 although the credit card information for the payment of the fare needs to be input. Even in this case, the server 500 can charge the fare in accordance with the input information.

7. Modifications

As discussed above, the information processing device, information processing method and information processing program according to the above embodiments can offer high-quality services, even if an item is left behind or soiling occurs in an autonomously driving vehicle, in which no driver is present. The above embodiments are discussed merely as examples, and can be modified in various manners. For example, the third to sixth embodiments can be separately achieved. In particular, the above embodiments are assumed to provide approaches for handling a left-behind item explained in the first and second embodiment. However, the determination of soiling in the third embodiment, detection of an odor in the fourth embodiment, determination of a fare in accordance with the ride behavior in the fifth embodiment, and change of user information in the sixth embodiment may be independently achieved.

Furthermore, in the above embodiments, an example of an autonomous driving taxi has been explained. The embodiments, however, are not limited to a taxi, and may be applied to a bus in which an unspecified number or specific number of passengers may ride. With regard to buses, the application may be preferably made, for example, to a bus that connects two locations, or a long-distance bus making only a few stops. In such type buses, there is a lower turnover of seated passengers, who remain seated for the duration of the ride. It would therefore be easier to look for any left-behind item in these buses via image recognition or the like, with a smaller blind spot, in comparison to route buses in which passengers constantly come and go. The embodiments are also applicable to rental cars and other vehicles. Furthermore, in addition to vehicles, the embodiments may be applied in a wide range of field, to trains and the like.

Figure 34A:
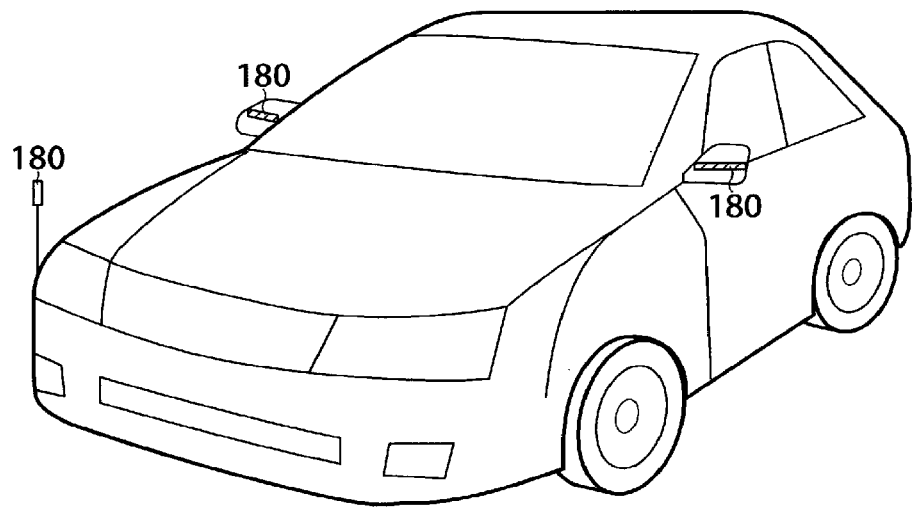
FIG. 34A and FIG. 34B are external views of a taxi according to a modification example of the first to sixth embodiments.
Figure 34B:
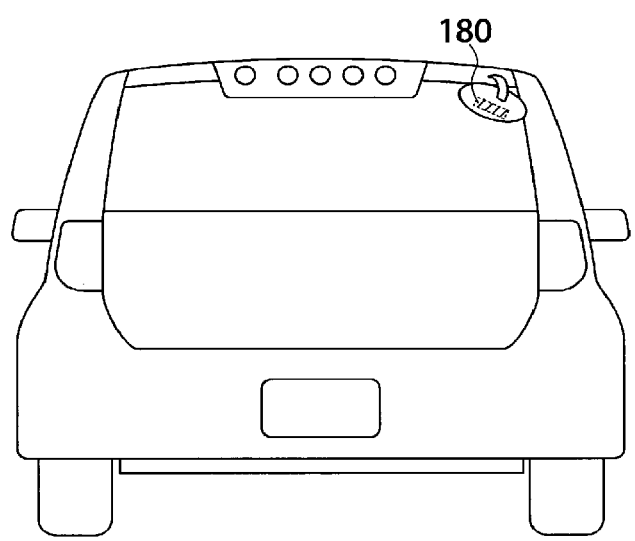

Examples of detection of any change (left-behind item, soiling, odor) inside a vehicle have been explained in the first to fourth embodiments. A change outside the vehicle may also be detected. FIGS. 34A and 34B are a three-quarter view and rear view of the exterior of the vehicle 100 according to the modification example.

As illustrated in these drawings, a 360-degree photographing camera 180 may be mounted inside the side mirrors, bumper corner pole, and/or rear under-mirror. By comparing the pre-ride data photographed by the camera 180 before a passenger's ride with post-ride data photographed after the ride, a dent or the like on the body of the vehicle 100 may be detected. If the dent or the like is intentionally made by the passenger, the user points may be considerably reduced, or any ride thereafter may be denied. The 360-degree photographing cameras may also be adopted for the sensors 106 explained in the first embodiment. If this is the case, the number of sensors 106 required may be reduced.

Furthermore, the determination of a left-behind item or soiling is made by image recognition or image comprehension in the first to third embodiments. In the example explained above, if the determination of a left-behind item is made, the user is asked how such an item should be handled. However, if it is determined that the left-behind item includes valuables such as a wallet, the item may be delivered to the user without asking the user, while sending a notification of the left-behind item to the smartphone of the user. On the other hand, an umbrella on a sunny day may be determined as less valuable, and thus may be kept in a station 200 without asking the user. Whether or not it is a sunny day can be determined from the movement of the wipers of the vehicle 100 or from weather information obtained from a website via the Internet. The determination of a soiled area can be performed in the same manner. If the soiling is determined to be of a serious level, the server 500 may return the vehicle 100 to a station 200, while if the soiling is determined to be minor, the service operation may be continued. The valuableness of an item that has been left behind differs depending on individuals. For this reason, items that require immediate delivery in case they are left behind in a vehicle may be entered in advance into the user database 538 by the user. Alternatively or additionally, the server 500 keeps a left-behind item list so that the user can designate whether they should be immediately delivered or kept at a station, for each of the items on this list if they are left behind in the vehicle.

The operations in the flowchart explained in the above embodiments can be exchanged whenever possible, or can be executed in parallel. The exemplary images explained in the embodiments are merely presented as examples, and are not restricted as long as the images have a design that can convey what should be conveyed.

Various functions explained in the above embodiments may be implemented by hardware, or by a combination of software and hardware. If the functions are implemented by software, such functions may be stored as one or more commands or codes (programs) in a computer-readable memory medium, or transmitted by the memory medium. The memory medium is not limited to any type, as long as it is accessible from a computer or processor. Examples of the memory media include a RAM, ROM, EEPROM (Trademark) (including a USB memory and memory card), optical disk such as CD-ROM, and magnetic disk such as hard disk. The programs may be transmitted by wireless or wired electric communication line. The same applies to various types of data.

The embodiments of the present invention have been explained. These are presented merely as examples and are not intended to restrict the scope of the invention. These embodiments may be realized in various other forms, and various omissions, replacements, and changes can be made without departing from the gist of the invention. Such embodiments and modifications are included in the scope and gist of the invention, and are included in the scope of the invention described in the claims and its equivalence.

What is claimed is:

1. An information processing device comprising:
a first memory configured to store first image data of interior of a vehicle acquired by an image sensor at a first point in time;
a first receiver configured to receive second image data of the interior of the vehicle acquired by the image sensor at a second point of time, which is later than the first point in time, from the vehicle by wireless communication;
a first determination section configured to compare the first image data with the second image data and determine whether a left-behind item a first passenger has left is inside the vehicle between the first point in time and the second point in time, based on the first image data and the second image data;
a first transmitter configured to transmit first data based on the determination result obtained at the first determination section, to the vehicle by wireless communication;
a second transmitter configured to, when the first determination section determines that the left-behind item is present, transmit a message that prompts the first passenger to select handling of the left-behind item, to an information terminal of the first passenger;
a suspension processing section configured to receive selection information relating to the handling of the left-behind item from the information terminal of the first passenger, suspend services of the vehicle based on the selection information, and set a new destination for the vehicle; and
a reward point providing section configured to, when a second passenger different from the first passenger takes the vehicle in which the left-behind item is present, provide a reward point to the second passenger in accordance with a behavior of the second passenger to the left-behind item.

2. The device according to claim 1, wherein the vehicle is capable of autonomous driving without a driver for general passenger automobile transportation business.

3. An information processing device comprising:
a calculation section configured to receive a dispatch request of a driver-free autonomous driving vehicle from a first terminal, associate a first vehicle with a first user corresponding to the first terminal by referring to a first database including information of a dispatch schedule of in-service vehicles, and calculate a fare based on first fare information corresponding to the first user by referring to a second database including information of reward points given to users in accordance with a behavior of the users to a left-behind item in a vehicle; and
a change section configured to receive a fare payer change request from the first vehicle, and associate the first vehicle with a second user, who is different from the first user, in the first database.

4. The device according to claim 3, wherein the first terminal is associated with the first user, and
the first vehicle requested by the first terminal picks up the second user and receives the change request from the second user.

5. An information processing method for controlling a driver-free autonomous driving vehicle, the method comprising:
receiving second image data of interior of the vehicle acquired by an image sensor at a second point in time, which is later than a first point in time, from the vehicle by wireless communication;
determining whether a left-behind item a first passenger has left is inside the vehicle between the first point in time and the second point in time, based on first image data of interior of the vehicle acquired by the image sensor at the first point in time and the second image data;
transmitting first data based on the determination result, to the vehicle by wireless communication;
transmitting, when the left-behind item is present, a message that prompts the first passenger to select handling of the left-behind item, to an information terminal of the first passenger;
receiving selection information relating to the handling of the left-behind item from the information terminal of the first passenger;
suspending services of the vehicle based on the selection information;
setting a new destination for the vehicle; and
providing, when a second passenger different from the first passenger takes the vehicle in which the left-behind item is present, a reward point to the second passenger in accordance with a behavior of the second passenger to the left-behind item.

6. A non-transitory computer readable medium storing a program for controlling a driver-free autonomous driving vehicle, the program executed by a processor comprising:
receiving second image data of interior of the vehicle acquired by an image sensor at a second point in time, which is later than a first point in time, from the vehicle by wireless communication;
determining whether a left-behind item a first passenger has left is inside the vehicle between the first point in time and the second point in time, based on first image data of interior of the vehicle acquired by the image sensor at the first point in time and the second image data;
transmitting first data based on a determination result, to the vehicle by wireless communication;
transmitting, when the left-behind item is present, a message that prompts the first passenger to select handling of the left-behind item, to an information terminal of the first passenger;
receiving selection information relating to the handling of the left-behind item from the information terminal of the first passenger;
suspending services of the vehicle based on the selection information;
setting a new destination for the vehicle; and
providing, when a second passenger different from the first passenger takes the vehicle in which the left-behind item is present, a reward point to the second passenger in accordance with a behavior of the second passenger to the left-behind item.

\* \* \* \* \*